United States Patent
Kim

(10) Patent No.: US 11,290,884 B2
(45) Date of Patent: Mar. 29, 2022

(54) V2X COMMUNICATION DEVICE AND DATA COMMUNICATION METHOD THEREOF

(71) Applicant: LG Electronics Inc., Seoul (KR)

(72) Inventor: Soyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 16/499,724

(22) PCT Filed: Mar. 8, 2018

(86) PCT No.: PCT/KR2018/002785
§ 371 (c)(1),
(2) Date: Sep. 30, 2019

(87) PCT Pub. No.: WO2018/182198
PCT Pub. Date: Oct. 4, 2018

(65) Prior Publication Data
US 2020/0045552 A1 Feb. 6, 2020

Related U.S. Application Data

(60) Provisional application No. 62/478,045, filed on Mar. 29, 2017.

(51) Int. Cl.
*H04L 29/06* (2006.01)
*H04L 29/08* (2006.01)
(Continued)

(52) U.S. Cl.
CPC .......... *H04W 12/068* (2021.01); *H04W 4/40* (2018.02); *H04W 12/069* (2021.01);
(Continued)

(58) Field of Classification Search
CPC .......... H04L 9/3268; H04L 2209/84; H04W 12/122; H04W 12/068; H04W 12/082;
(Continued)

(56) References Cited

U.S. PATENT DOCUMENTS 7,216,163 B2 * 5/2007 Sinn ..................... H04L 61/1523
709/203
9,258,295 B1 * 2/2016 Nedeltchev ......... H04L 63/0838
(Continued)

FOREIGN PATENT DOCUMENTS

JP 2013503403 1/2013
JP 2013513256 4/2013
(Continued)

OTHER PUBLICATIONS

"Misbehavior Detection and Attacker Identification in Vehicular Ad hoc Networks", Nov. 27, 2014, Waidner et al., pp. i-xvi and 1-193 (total 211 pages including front page).*
(Continued)

*Primary Examiner* — Haresh N Patel
(74) *Attorney, Agent, or Firm* — Fish & Richardson P.C.

(57) ABSTRACT

Disclosed is a data communication method of a vehicle-to-everything (V2X) communication device. The data communication method includes: sending a misbehavior detection (MBD) information request message for collecting information regarding MBD; receiving an MBD information response message as a response message to the MBD information request message from an external V2X communication device, the MBD information response message including MBD information including information regarding MBD of the external V2X communication device; and generating certificate revocation list (CRL) information based on the MBD information. The V2X communication device may have a preset security level required for the V2X communication device to be operated as a misbehavior breaker (MBB) generating the CRL information.

12 Claims, 24 Drawing Sheets

(51) Int. Cl.
*G06F 21/00* (2013.01)
*H04W 12/06* (2021.01)
*H04W 4/40* (2018.01)
*H04W 48/02* (2009.01)
*H04W 12/069* (2021.01)
*H04W 12/082* (2021.01)
*H04W 12/122* (2021.01)

(52) U.S. Cl.
CPC ....... *H04W 12/082* (2021.01); *H04W 12/122* (2021.01); *H04W 48/02* (2013.01)

(58) Field of Classification Search
CPC ..... H04W 4/40; H04W 12/069; H04W 48/02; H04W 4/06
USPC .......................................................... 726/4
See application file for complete search history.

(56) References Cited

U.S. PATENT DOCUMENTS

| | | | |
|---|---|---|---|
| 2002/0138572 A1* | 9/2002 | Delany | G06F 21/41 709/204 |
| 2002/0138577 A1* | 9/2002 | Teng | G06Q 10/10 709/205 |
| 2004/0064415 A1* | 4/2004 | Abdallah | G07C 9/27 705/50 |
| 2009/0260057 A1 | 10/2009 | Laberteaux et al. | |
| 2011/0083011 A1 | 4/2011 | DiCrescenzo | |
| 2013/0305043 A1 | 11/2013 | Zhang et al. | |
| 2013/0318343 A1* | 11/2013 | Bjarnason | H04L 63/08 713/157 |
| 2015/0052595 A1* | 2/2015 | Murphy | G06F 21/44 726/7 |
| 2015/0358170 A1 | 12/2015 | Ando et al. | |
| 2016/0087804 A1 | 3/2016 | Park et al. | |
| 2016/0119151 A1* | 4/2016 | Park | H04L 9/3268 713/158 |
| 2016/0119438 A1* | 4/2016 | Abramson | H04L 67/18 709/217 |
| 2016/0373440 A1* | 12/2016 | Mather | H04L 63/0861 |
| 2017/0222990 A1* | 8/2017 | Romansky | H04L 9/14 |
| 2018/0176209 A1* | 6/2018 | Narayanan | H04W 48/10 |
| 2019/0104563 A1* | 4/2019 | Olsson | H04W 76/38 |

FOREIGN PATENT DOCUMENTS

| | | |
|---|---|---|
| JP | 2016134170 | 7/2016 |
| KR | 101584001 | 1/2016 |
| KR | 101592788 | 2/2016 |
| KR | 20160038091 | 4/2016 |

OTHER PUBLICATIONS

[No Author Listed], Federal Register, vol. 82, No. 8, XP009517948, dated Jan. 12, 2017, 554 pages.

EP extended European search report, in European Appln. No. 18776843.7, dated Nov. 6, 2020, 9 pages.

Intelligent Transport Systems (ITS); Security, "Threat, Vulnerability and Risk Analysis (TVRA)," XP014046283, ETSI TR 102 893, V1.1.1, dated Mar. 2010, 86 pages.

JP Notice of Allowance in Japanese Appln. No. 2019-553927, dated Nov. 24, 2020, 4 pages (with English translation).

LG Electronics, "Discussion on MBD Distribution," XP014289966, ETSI ITS WGS #43, dated Apr. 5, 2017, 10 pages.

Raya et al., "Securing Vehicular Communications," XP011143978, Intervehicular Communications, dated Oct. 2006, 8 pages.

PCT International Search Report in International Appln. No. PCT/KR2018/002785, dated Mar. 8, 2018, 7 pages (with English translation).

Korean Notice of Allowance in Korean Appln. No. 10-2019-7032954, dated Aug. 25, 2020, 4 pages (with English translation).

* cited by examiner

V2X COMMUNICATION DEVICE AND DATA COMMUNICATION METHOD THEREOF

CROSS-REFERENCE TO RELATED APPLICATIONS

This application is the National Stage filing under 35 U.S.C. 371 of International Application No. PCT/KR2018/002785, filed on Mar. 8, 2018, which claims the benefit of U.S. Provisional Application No. 62/478,045, filed on Mar. 29, 2017, the contents of which are all hereby incorporated by reference herein in their entirety.

TECHNICAL FIELD

The present invention relates to a device for vehicle-to-everything (V2X) communication, and a data communication method, and more particularly, to management of misbehavior detection of a V2X communication device.

BACKGROUND ART

In recent years, a vehicle has become a result of industrial convergence technology in which an electric technology, an electronic technology, and a communication technology are mixed, rather than a result of mechanical engineering technology. For this reason, the vehicle is also called a smart car. The smart car will provide not only a traditional vehicular technology such as traffic safety and solving traffic congestion, but also various user-customized transport services in future by connecting a driver, a vehicle, a transport infrastructure, and the like to one another. Such a connectivity may be implemented by using a vehicle-to-everything (V2X) communication technology. A system providing connectivity of a vehicle may also be referred to as a connected vehicle system.

DISCLOSURE

Technical Problem

With enhancement and improvement in connectivity of a vehicle, an amount and the number of types of services to which V2X communication is applicable have also been increased. Further, the V2X communication requires low latency to increase trustability and accuracy of a message. In contrast, since available channels are limited, an efficient V2X communication method is required.

Technical Solution

In order to solve the above-described technical problems, a data communication method of a vehicle-to-everything (V2X) communication device according to an embodiment of the present invention includes: sending a misbehavior detection (MBD) information request message for collecting information regarding MBD; receiving an MBD information response message as a response message to the MBD information request message from an external V2X communication device, the MBD information response message including MBD information including information regarding MBD of the external V2X communication device; and generating certificate revocation list (CRL) information based on the MBD information. The V2X communication device may have a preset security level required for the V2X communication device to be operated as a misbehavior broker (MBB) generating the CRL information.

According to an embodiment, the MBD information request message may include MBB announcement information used to notify that the V2X communication device corresponds to the MBB.

According to an embodiment, the MBD information request message may be periodically sent.

According to an embodiment, the data communication method may further include forwarding the CRL information to a CRL distribution device in a case in which the V2X communication device is operated in a first mode. The CRL information may be broadcasted by the CRL distribution device.

According to an embodiment, in the forwarding of the CRL information to the CRL distribution device, the CRL information may be forwarded to the CRL distribution device through a V2X communication device of an infrastructure, or may be directly forwarded to the CRL distribution device through a long distance network.

According to an embodiment, the data communication method may further include broadcasting the CRL information in a case in which the V2X communication device is operated in a second mode.

A V2X communication device according to an embodiment of the present invention includes: a secured/unsecured storage device storing data; a radio frequency (RF) unit transmitting and receiving a wireless signal; and a processor controlling the RF unit. The processor may be configured to: send an MBD information request message for collecting information regarding MBD; receive an MBD information response message as a response message to the MBD information request message from an external V2X communication device, the MBD information response message including MBD information including information regarding MBD of the external V2X communication device; and generate CRL information based on the MBD information, and the V2X communication device may have a preset security level required for the V2X communication device to be operated as an MBB generating the CRL information.

According to an embodiment, the MBD information request message may include MBB announcement information used to notify that the V2X communication device corresponds to the MBB.

According to an embodiment, the MBD information request message may be periodically sent.

According to an embodiment, the processor may be further configured to forward the CRL information to a CRL distribution device in a case in which the V2X communication device is operated in a first mode. The CRL information may be broadcasted by the CRL distribution device.

According to an embodiment, in the forwarding of the CRL information to the CRL distribution device, the CRL information may be forwarded to the CRL distribution device through a V2X communication device of an infrastructure, or may be directly forwarded to the CRL distribution device through a long distance network.

According to an embodiment, the processor may be further configured to broadcast the CRL information in a case in which the V2X communication device is operated in a second mode.

Advantageous Effects

A V2X communication device of a vehicle having mobility may be operated as a misbehavior broker for collecting misbehavior information and/or generating certificate revocation list (CRL) information, such that it is possible to efficiently manage misbehavior detection.

Since the V2X communication device may directly send CRL information without going through a separate distribution device for broadcasting the CRL information, another V2X communication device receiving the CRL information may exclude a V2X communication device of which a misbehavior is detected, from V2X communication.

Since the V2X communication device may forward CRL information to a distribution device through long distance network connection such as cellular network connection, it is possible to forward the CRL information to the distribution device even in the case in which the V2X communication device is not within a communication range of a V2X communication device of an infrastructure connected to the distribution device.

Hereinafter, an additional description of the advantageous effects of the present invention will be provided together with a description of a configuration of the present invention.

BEST MODE FOR INVENTION

Exemplary embodiments of the present invention will be described in detail, and examples thereof are illustrated in the accompanying drawings. The detailed description, which will be given below with reference to the accompanying drawings, is intended to explain exemplary embodiments of the present invention, rather than to show only embodiments that may be implemented according to the present invention. The following detailed description includes specific details in order to provide a thorough understanding of the present invention. However, it will be apparent to those skilled in the art that the present invention may be practiced without such specific details. In the present invention, respective embodiments described below need not be used separately. Multiple embodiments or all embodiments may be used together and a combination of specific embodiments may be also be used.

Although most terms used in the present invention have been selected from general ones widely used in the art, some terms have been arbitrarily selected by the applicant and their meanings are explained in detail in the following description as needed. Therefore, the present invention should be understood based upon the intended meanings of the terms rather than their simple names or meanings.

The present invention relates to a vehicle-to-everything (V2X) communication device, in which the V2X communication device may be included in an intelligent transport system (ITS) to perform all or part of functions of the ITS. The V2X communication device may perform vehicle-to-vehicle communication, vehicle-to-infrastructure communication, vehicle-to-bicycle communication, vehicle-to-mobile communication, and the like. According to an embodiment, the V2X communication device may be an on board unit (OBU) of a vehicle, or may be included in an OBU. The OBU may also be referred to as an on board equipment (OBE). The V2X communication device may be a roadside unit (RSU) of an infrastructure, or may be included in an RSU. The RSU may also be referred to as a roadside equipment (RSE). Alternatively, the V2X communication device may be an ITS station, or may be included in the ITS station. Any OBU, RSU, mobile equipment, or the like that performs V2X communication may be collectively referred to as an ITS station. Alternatively, the V2X communication device may be a wireless access in vehicular environments (WAVE) device, or may be included in the WAVE device. The V2X communication device may also be abbreviated to V2X device.

Figure 1:
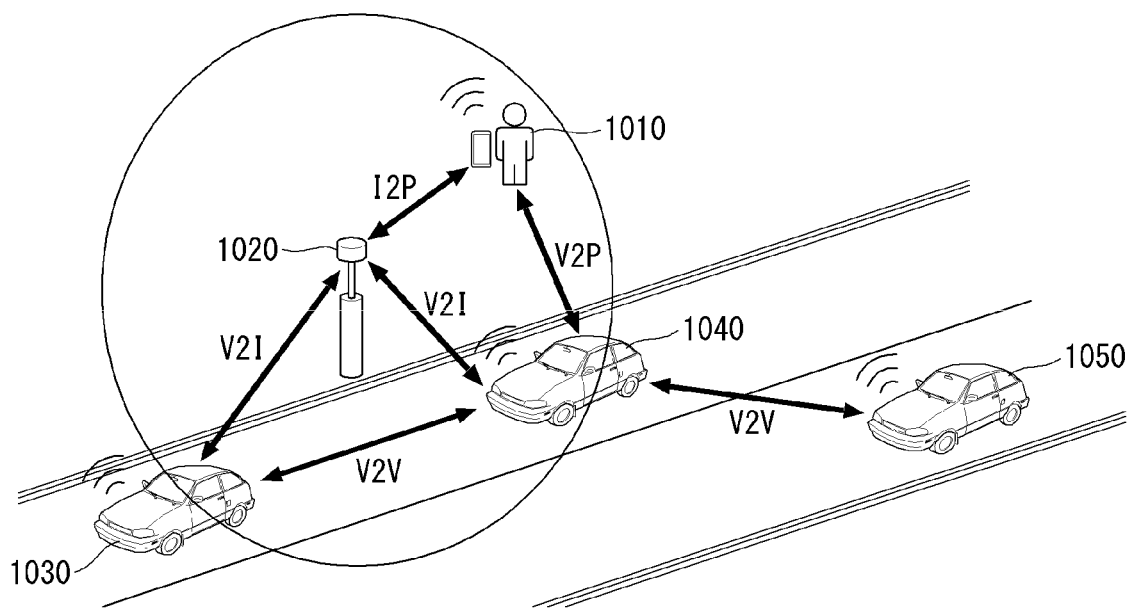
FIG. 1 illustrates a cooperative intelligent transport system according to an embodiment of the present invention.

FIG. 1 illustrates a cooperative intelligent transport system (C-ITS) according to an embodiment of the present invention.

The C-ITS is a system in which an information communication, control, and electronic technology is added to the existing transport system to improve efficiency in transport management and improve user convenience and safety. In the C-ITS, in addition to a vehicle, a transport infrastructure system such as a traffic light and an electronic display also performs V2X communication, and such an infrastructure may also be abbreviated to RSU as described above.

As illustrated in FIG. 1, in the C-ITS, a pedestrian device 1010, an RSU 1020, and vehicles 1030, 1040, and 1050, each of which includes the V2X communication device, perform communication with one another. According to an embodiment, the V2X communication may be performed based on a communication technology of IEEE 802.11p. The communication technology based on IEEE 802.11p may also be referred to as dedicated short-range communication (DSRC). According to an embodiment, the V2X communication based on IEEE 802.11p may be short-range communication within a range of about 600 m. Through the V2X communication, a cooperative awareness message (CAM) or a decentralized environmental notification message (DENM) may be broadcasted.

The CAM is distributed in an ITS network, and provides information regarding at least one of a presence, a location, or a communication state of the ITS station. The DENM provides information regarding a detected event. The DENM may provide information regarding any traveling situation or an event detected by the ITS station. For example, the DENM may provide information regarding a situation such as an emergency electronic brake light, an automobile accident, a vehicle problem, and traffic conditions.

In FIG. 1, the vehicles 1030 and 1040 are present within a communication coverage of the RSU 1020. However, the vehicle 1050 is present outside the communication range of the RSU 1020, and thus may not directly perform communication with the RSU.

Figure 2:
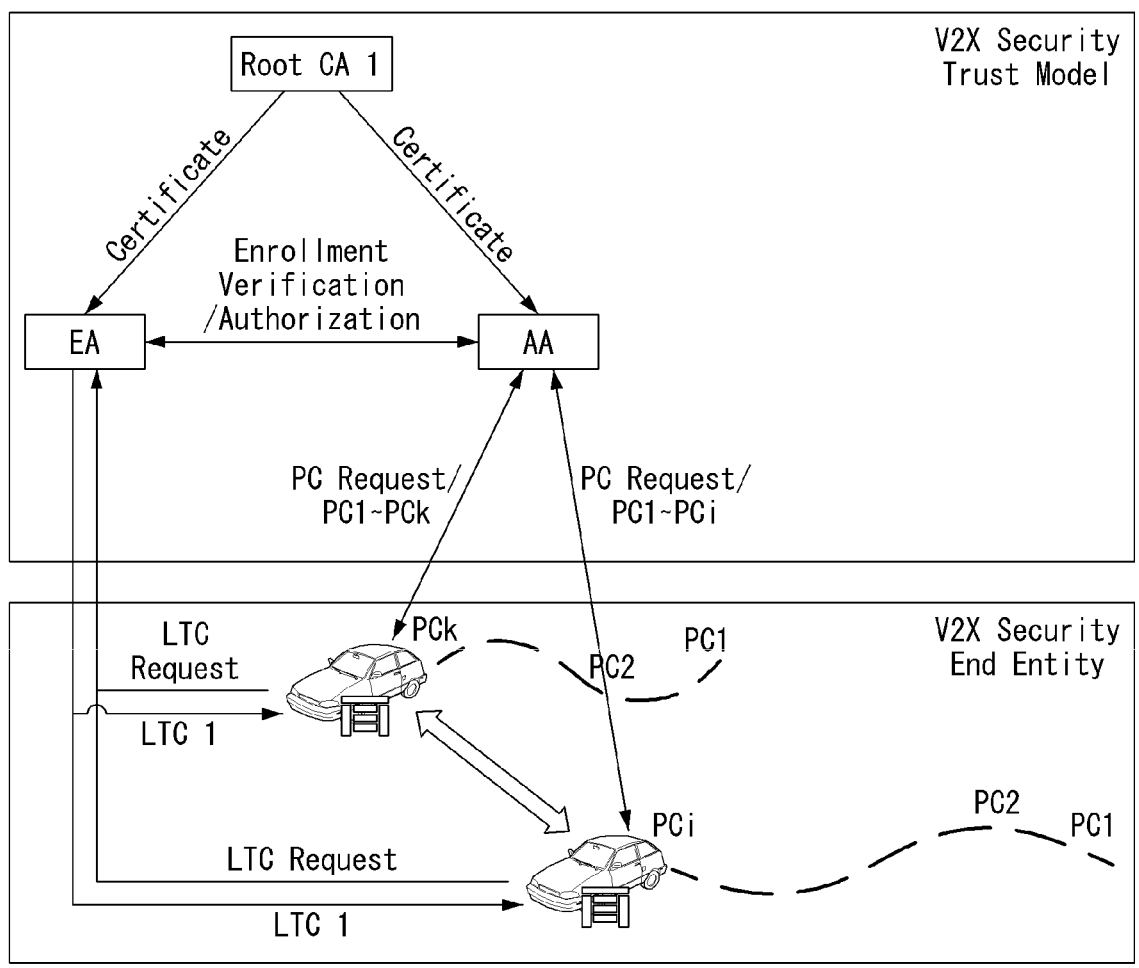
FIG. 2 illustrates a trust message communication method of a vehicle-to-everything (V2X) communication system according to an embodiment of the present invention.

FIG. 2 illustrates a trust message communication method of a V2X communication system according to an embodiment of the present invention.

According to an embodiment illustrated in FIG. 2, the V2X communication system may be a security system required for V2X communication devices (e.g., an ITS station or a WAVE device) to safely send and receive a message for V2X communication. Such a V2X communication system may include one or more entities for trusted communication for a message. For example, the V2X communication system may include a root certificate authority (CA), an enrollment authority (EA), an authorization authority (AA), and/or at least one V2X communication device, as illustrated in FIG. 2. According to an embodiment, the V2X communication device may be an OBE, or an RSE.

The root CA may provide the EA and the AA with a proof to issue enrollment credentials. Such a root CA may define authorities and duties of the EA and the AA, certify the EA and the AA, and check performance of the duties by the EA and the AA. As such, the EA and AA may be controlled by the root CA.

The EA is an entity serving to manage a life cycle of the enrollment credentials, and may certify the V2X communication device and grant an access to V2X communication. The EA may also be referred to as a long-term certificate authority. Such an EA may issue an enrollment certificate (EC). The V2X communication device may have the EC for certification of whether the sending V2X communication device is a certified V2X sending device. The EC may also be referred to as a long term certificate (LTC).

The AA is an entity serving to issue an authorization ticket (AT) and monitor use of the AT, and may provide the V2X communication device with an authoritative proof to allow the V2X communication device to use a specific V2X service. The AA may also be referred to as a short-term certificate authority or a pseudonym certificate authority. Such an AA may issue the AT. The V2X communication device may have the AT for authentication of a V2X message (e.g., CAM or DENM) received by the V2X communication device. The AT may also be referred to as a short-term certificate or a pseudonym certificate (PC).

The V2X communication device may acquire the right to access V2X communication from the EA, and may negotiate with the AA for the right to call a V2X service. For example, the V2X communication device may request the EA for the EC (LCT), and acquire the EC from the EA. Further, the V2X communication device may request the AA for the AT (PC), and acquire the EC from the EA. In addition, the V2X communication device may send and receive a V2X message. For example, the V2X communication device may perform communication for a trust message with another V2X communication device by using the EC and the AT. Further, the V2X communication device may forward a receive V2X message to another V2X communication device. In the present specification, a V2X communication device sending a V2X message is referred to as a sending V2X communication device, a V2X communication device receiving a V2X message is referred to as a receiving V2X communication device, and a V2X communication device forwarding a received V2X communication device to another V2X communication device is referred to as a relaying V2X communication device.

A method in which V2X communication devices in the V2X communication system (security system) including the entities described above perform trust message communication will be described below in detail with reference to the respective drawings.

Figure 3:
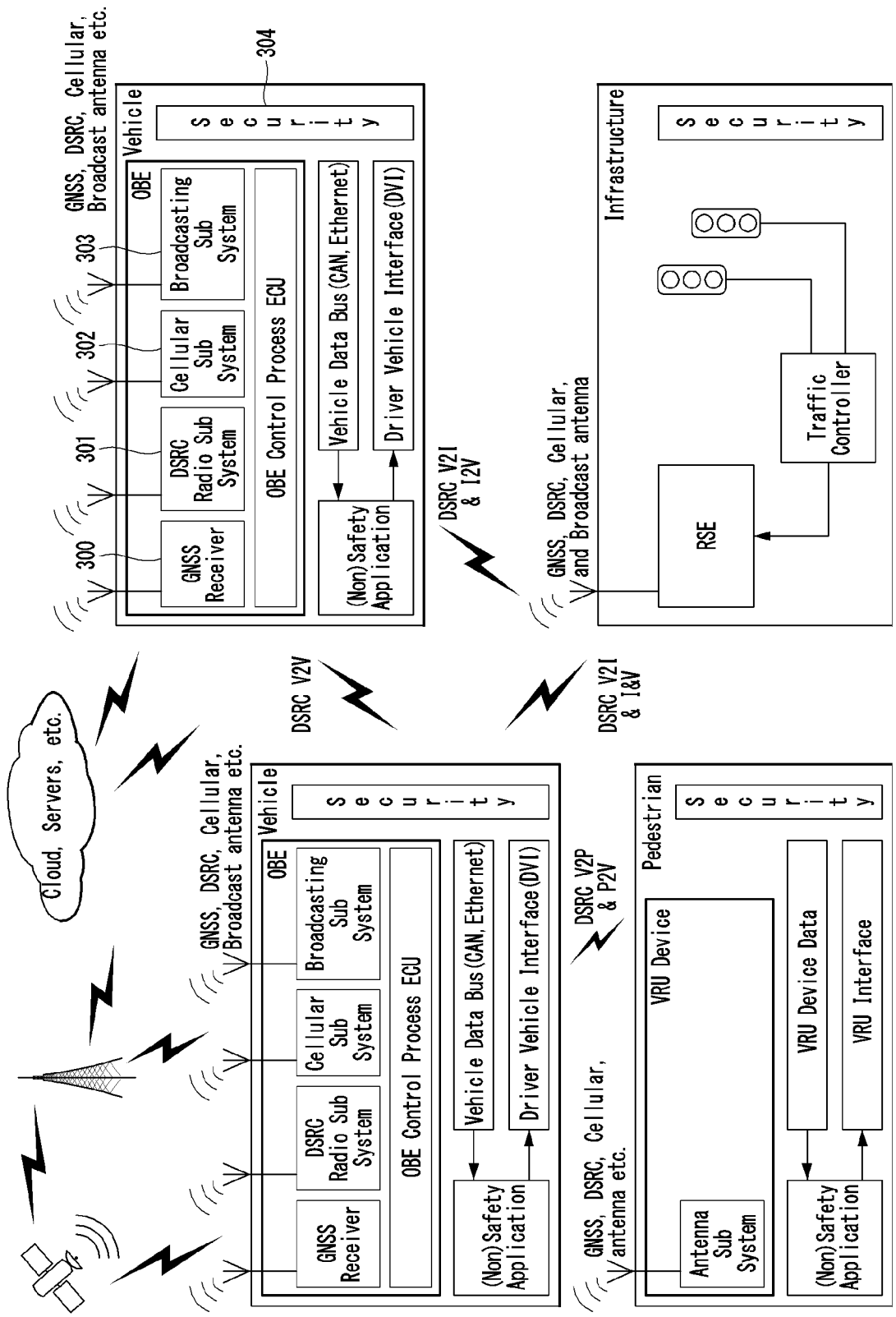
FIG. 3 illustrates communication between V2X communication devices according to an embodiment of the present invention.

FIG. 3 illustrates communication between V2X communication devices according to an embodiment of the present invention.

In a connected vehicle system, V2X communication devices mounted in a vehicle, an infrastructure, and a personalized device of a pedestrian may include device components illustrated in FIG. 3, respectively.

A description of components included in a V2X communication device of a vehicle according to an embodiment illustrated in FIG. 3 will be provided below. A V2X communication device of a vehicle may further include an OBE. According to an embodiment, the OBE may include a plurality of antenna systems and an OBE control process electronic control unit (ECU). Antenna system components may be integrated with each other or may be individually provided. Alternatively, a combination of some of the antenna system components may be included.

Global navigation satellite system (GNSS): A satellite navigation system that uses a radio wave transmitted from a satellite to calculate a location, a height, and a speed of a moving object across the earth, which may correspond to an antenna and a subsystem thereof included in a V2X communication device of a vehicle and configured to obtain location information of the vehicle Dedicated short range communication (DSRC) radio subsystem: An antenna and a subsystem thereof for sending/reception according to a DSRC protocol Cellular subsystem: An antenna and a subsystem thereof for cellular data communication Broadcasting subsystem: An antenna and a subsystem thereof for sending/reception of broadcasting data OBE control process ECU: The OBE control process ECU may be abbreviated to a controller or a processor. The controller may process a data message received from a plurality of heterogeneous systems and control other ECUs in the vehicle to perform appropriate operation. The controller may execute an application for the data processing and vehicle control/operation. Further, the controller may process sensing data received from other electronic equipment or sensors in the vehicle and send the processed sensing data to external V2X communication devices/vehicles. According to an embodiment, all information in the vehicle may be converted into a standardized format that is sharable through the controller. As illustrated in FIG. 3, a safety application may be executed to send and receive information to and from a bus such as a controller area network (CAN) or Ethernet in the vehicle. Further, information may be provided to a user through a driver vehicle interface (DVI) such as a stereo and a display in the vehicle.

The V2X communication device configured as described above may perform communication with an infrastructure, a pedestrian, and a supported system such as a cloud/server, in addition to another vehicle.

A description of components included in a V2X communication device of an infrastructure according to an embodiment illustrated in FIG. 3 will be provided below. A V2X communication device of an infrastructure may include an RSE. Similarly to the OBE of the vehicle, the RSE may include a plurality of antenna systems and a controller (processor). Antenna system components may be integrated with each other or may be individually provided. Alternatively, a combination of some of the antenna system components may be included. Meanwhile, the controller of the RSE may perform operations that are the same as or similar to those of the controller of the OBE. For example, the controller of the RSE may process a data message received from a plurality of heterogeneous systems and control other ECUs in the infrastructure to perform appropriate operation.

The RSE may receive information from a traffic controller to perform communication with a vehicle. The RSE may be a fixed device, and may be backend-connected to be operated as a provider. However, according to an embodiment, the RSE may collect information from a vehicle and send the information again, and thus the RSE may be operated not only as a provider device, but also as a user device.

A description of components included in a V2X communication device of a personalized device (VRU device) of a pedestrian according to an embodiment illustrated in FIG. 3 will be provided below. The V2X communication device of the VRU device may include a plurality of antenna systems and a controller (processor). Antenna system components may be integrated with each other or may be individually provided. Alternatively, a combination of some of the antenna system components may be included. Meanwhile, the controller of the VRU device may perform operations that are the same as or similar to those of the controller of the OBE. For example, the controller of the VRU device may process a data message received from a plurality of heterogeneous systems and control other ECUs in the personalized device to perform appropriate operation. The controller may execute an application for the data processing and control/operation of the personalized device. Further, the controller may process sensing data received from other electronic equipment or sensors in the personalized device and send the processed sensing data to external V2X communication devices. As illustrated in FIG. 3, a safety application may be executed to send and receive information to and from components in the personalized device. Further, information may be provided to a user through a VRU interface such as a stereo and a display in the personalized device.

As illustrated in FIG. 3, communication between vehicles may be referred to as V2V communication, communication between a vehicle and an infrastructure may be referred to as V2I communication or I2V communication, and communication between a vehicle and a personalized device of a pedestrian may be referred to as V2P communication or P2V communication. As illustrated in FIG. 3, communication between vehicles using DSRC may be referred to as DSRC V2V communication, communication between a vehicle and an infrastructure using DSRC may be referred to as DSRC V2I communication or DSRC I2V communication, and communication between a vehicle and a personalized device of a pedestrian using DSRC may be referred to as DSRC V2P communication or DSRC P2V communication. Meanwhile, communication between a vehicle and another V2X communication device may be collectively referred to as V2X communication, and communication between a V2X communication device and another V2X communication device may be collectively referred to as X2X communication.

Figure 4:
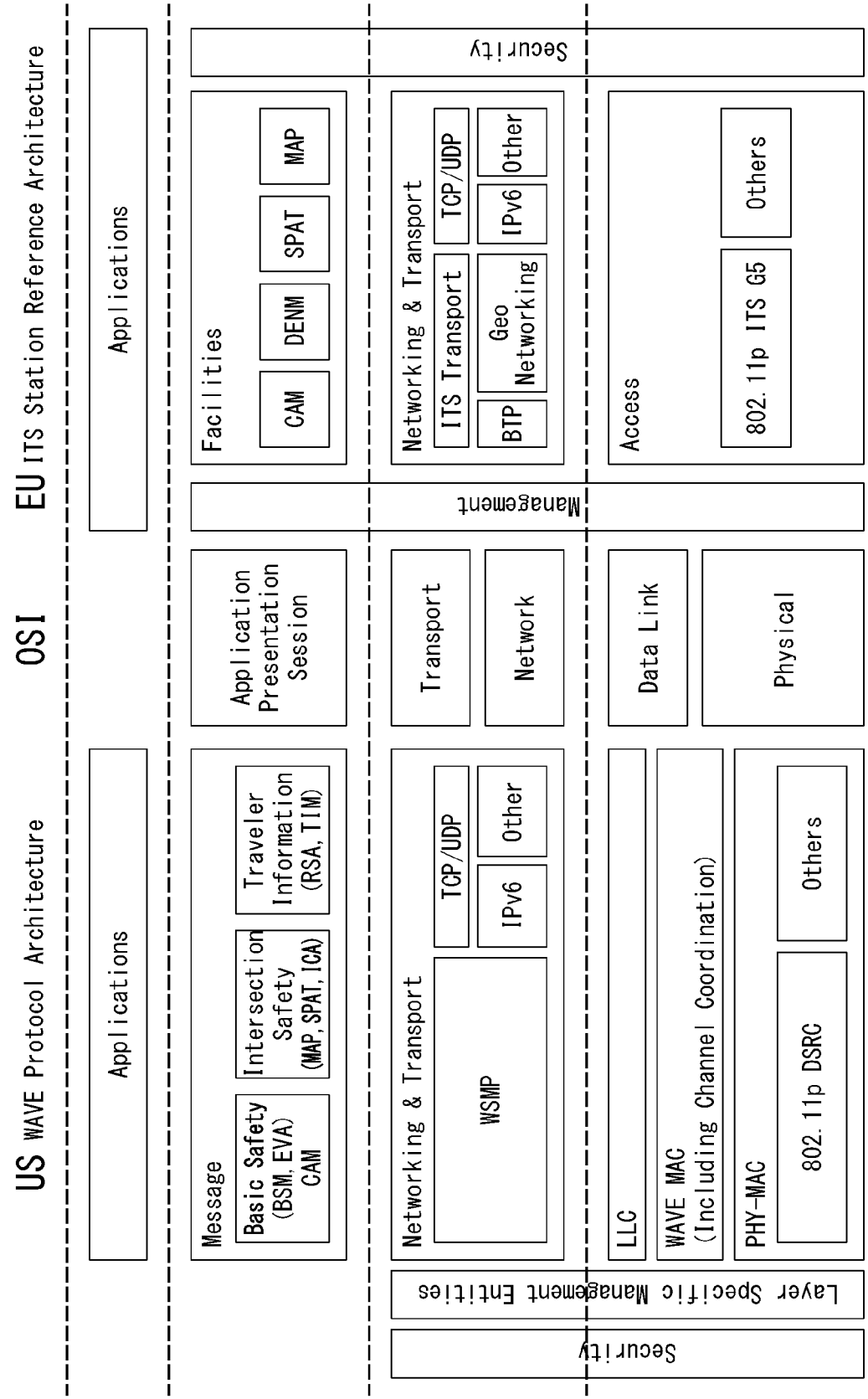
FIG. 4 illustrates a protocol stack of a V2X communication device according to an embodiment of the present invention.

FIG. 4 illustrates a protocol stack of a V2X communication device according to an embodiment of the present invention. Specifically, FIG. 4 illustrates a protocol stack of a V2X communication device of United States (US) or Europe (EU) according to an embodiment of the present invention.

The V2X communication devices illustrated in FIG. 3 may perform communication with one another by using a communication protocol for V2X communication illustrated in FIG. 4.

Description of respective layers illustrated in FIG. 4 is provided below.

Applications layer: The applications layer may implement and support various use cases. For example, an application may provide information regarding road safety, efficient traffic information, information regarding other applications.

Facilities layer: The facilities layer is a layer corresponding to open systems interconnection (OSI) layer 5 (session layer), OSI layer 6 (presentation layer), and OSI layer 7 (application layer). The facilities layer may support effective implementation of various use cases defined in the applications layer. For example, the facilities layer may provide an application programming interface (API) for encoding/decoding a message for supporting an application. According to an embodiment, the message may be encoded/decoded in abstract syntax notation one (ASN.1).

A service and a message set provided in the facilities layer is defined by the Society of Automotive Engineers (SAE) in U.S., and is defined by Intelligent Transport Systems (ITS) of European Telecommunications Standards Institute in Europe. For example, a basic safety message (BSM) for supporting a basic safety application, an emergency vehicle alert (EVA) message, a MAP (mapdata) message for supporting an intersection safety application, a signal phase and timing (SPAT) message, an intersection collision alert (ICA) message, a roadside alert (RSA) message for supporting a traveler information application, a traveler information message (TIM), and the like may be provided as the message set in U.S. A cooperative awareness message (CAM), a decentralized environmental notification message (DENM), and the like may be provided as the message set in Europe.

Networking/transport layer: The networking/transport layer is a layer corresponding to OSI layer 3 (network layer) and OSI layer 4 (transport layer). The networking/transport layer may configure a network for vehicle communication between homogenous/heterogeneous networks by using various transport protocols and network protocols. For example, the networking/transport layer may provide Internet access and routing using the Internet protocol such as TCP/UDP+IPv6. Alternatively, the networking/transport layer may configure a vehicle network by using a geographical-position-based protocol such as basic transport protocol (BTP)/GeoNetworking. Alternatively, the networking/transport layer may configure a vehicle network by using a WAVE short message protocol (WSMP) (e.g., WSMP-N and WSMP-T).

Further, the networking/transport layer may provide an advertisement of provided services. For example, such an advertisement may be provided through WAVE service advertisement (WSA) in U.S., and may be provided through a service announcement message (SAM) in Europe.

Access layer: The access layer is a layer corresponding to OSI layer 1 (physical layer) and OSI layer 2 (data link layer). The access layer may send, on a physical channel, a message/data received from a higher layer. For example, the access layer may perform/support data communication based on at least one of a communication technology based on IEEE 802.11 and/or 802.11p standard, a WIFI physical transmission technology based on IEEE 802.11 and/or 802.11p standard, a DSRC technology, a 2G/3G/4G (LTE)/5G wireless cellular communication technology including satellite/broadband wireless mobile communication, a global positioning system (GPS) technology, Bluetooth, or a WAVE technology based on IEEE 1609. Meanwhile, in U.S., a medium access control (MAC) technology based on IEEE 1609.4 standard is complemented and used to support communication in a vehicle environment.

Security layer: The security layer is a layer for data trust and privacy. The security layer may provide an authentication function and an encryption function for assuring privacy. The authentication is used to indicate whether or not a sender is a certified V2X communication device and whether or not data are changed, and the encryption is used to keep secrets in data. According to an embodiment, the message or data generated in the networking/transport layer may be sent after being secured through the security layer according to a type of the message or data, or may be sent in a non-secured state.

Management layer: The management layer may provide multi-channel decentralized congestion control (MDCC). Further, the management layer may generate contents for a service advertisement based on information received from a higher layer, and the contents may include IP configuration information and security credential information. Further, the management layer may monitor the received service advertisement and estimate a channel quality to determine a channel allocation/switching schedule.

Hereinafter, a method in which a first type V2X communication device provides a security service will be described with reference to FIGS. 5 to 9, and a method in which a second type V2X communication device provides a security service will be described with reference to FIGS. 10 to 13. According to an embodiment, the first type V2X communication device may be a V2X communication device performing V2X communication according to the communication protocol of United States (US) in FIG. 4, and may be a V2X communication device performing V2X communication according to the communication protocol of Europe (EU) in FIG. 4

Figure 5:
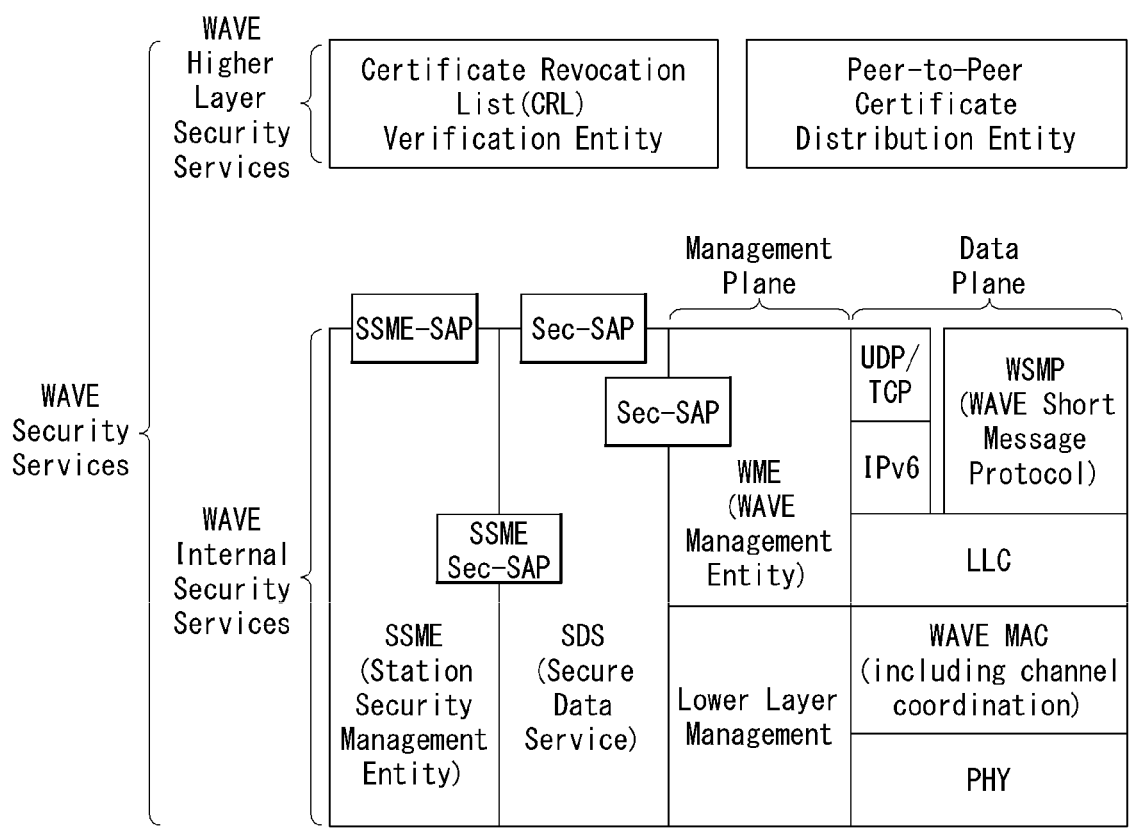
FIG. 5 illustrates a protocol stack of a V2X communication device providing a security service according to a first embodiment of the present invention.

FIG. 5 illustrates a protocol stack of a V2X communication device providing a security service according to a first embodiment of the present invention. According to an embodiment illustrated in FIG. 5, the V2X communication device may be a V2X communication device (e.g., WAVE device) providing a security service based on IEEE 1609.2 standard. The security service in FIG. 5 may be referred to as a WAVE security service, and the protocol stack in FIG. 5 may be referred to as a WAVE protocol stack. The security service illustrated in FIG. 5 may include an internal security service and a higher layer security service.

First, the internal security service may provide a secure data service (SDS) and a security services management entity (SSME).

The SDS may manage a protocol data unit (PDU). For example, the SDS may convert an unsecured PDU into a secured PDU (SPDU). Further, the SDS may perform processing of the SPDU at the time of reception, and in this processing, the SPDU is converted into a PDU. In this case, a format of the SPDU may be signed data or encrypted data. An entity using the secure data service may be referred to as a secure data exchange entity (SDEE).

The SSME may manage information regarding certificates. For example, the SSME may store/manage certificates stored in the SDS and certificate information regarding certificates belonging to certificate authorities (CA).

The higher layer security service may provide a certificate revocation list verification entity (CRLVE) and a peer-to-peer certificate distribution entity (P2PCDE).

The CRLVE may verify an incoming certificate revocation list (CRL). For example, the CRLVE may verify a CRL received from the SSME or to be forwarded to the SSME. Further, the CRLVE may forward relevant revocation information to the SSME for storage.

The P2PCDE enables peer-to-peer certificate distribution. The P2PCDE allows the WAVE device to learn unknown certificates. In this case, the WAVE device may request another peer device for necessary information and learn the unknown certificates by using the information.

In order to provide the above-described service, IEEE 1609.2 standard illustrated in FIG. 5 provides a service access point (SAP) (e.g., Sec-SAP, SSME SAP, and SSME-Sec SAP), and communication from one entity to another entity based on IEEE 1609.2 standard may be performed through the SAP. Such a communication may be referred to as data exchange between SDEEs.

Figure 6:
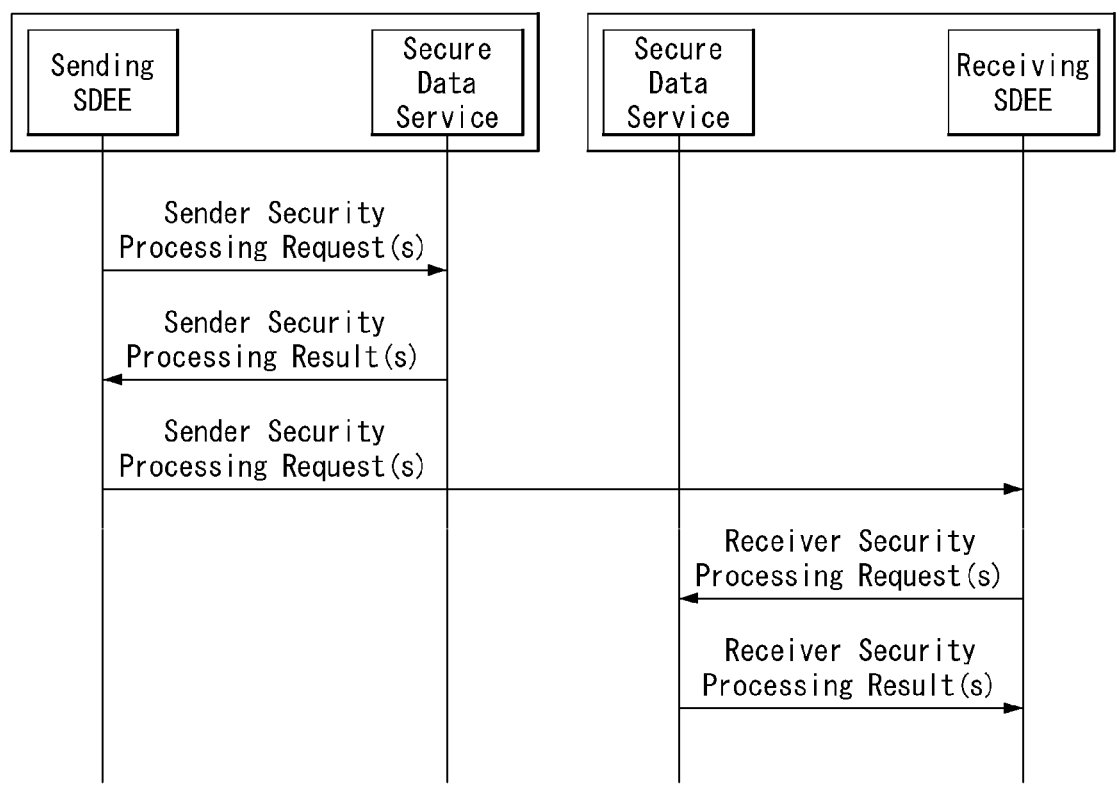
FIG. 6 illustrates a method in which a V2X communication device performs security processing according to an embodiment of the present invention.

FIG. 6 illustrates a method in which a V2X communication device performs security processing according to an embodiment of the present invention. Similarly to FIG. 5, according to an embodiment illustrated in FIG. 6, the V2X communication device may be a V2X communication device (e.g., WAVE device) providing a security service based on IEEE 1609.2 standard. The embodiment illustrated in FIG. 6 shows an illustrative flow of security processing using the SDS.

Referring to FIG. 6, the SDS may be called by the SDEE together with a request for processing data. The processed data may be returned to the SDEE that performs the call. The secure data exchange may include two SDEEs, one of which may be a sending SDEE, and the other of which may be a receiving SDEE.

The sending SDEE may call the SDS to perform security processing for sending. In this case, a result of the processing may be an SPDU returned to a sending entity. The sending SDEE may call the SDS at least once, if possible, may call the SDS multiple times before sending the SPDU.

The receiving SDEE may call the SDS to perform security processing for contents of the received SPDU. In this case, a result of the processing that may include the SPDU and additional information regarding the SPDU may be returned to the receiving SDEE. Complete processing of the received SPDU may require multiple calls.

Hereinafter, a security management system for managing credentials of a public key infrastructure (PKI) will be described. For example, a certificate request, certificate management, a CRL distribution, and the like, through the security management system will be described. The security management system may also be referred to as a security credentials management system (SCMS) or a trust model.

Before describing the security management system, various types of certificates managed by the security management system will be described first. The V2X communication system supports various types of certificates, and the security management system may issue and revoke the certificates. The respective certificates may have different lifetimes and renewal frequencies. For example, the root CA may have a lifetime of 17 years, and the EA controlled by the root CA may have a lifetime of 11 years, and the EC issued by the EA may have a lifetime of 6 years.

First, a vehicle or an OBE of a vehicle may have an OBE enrollment certificate (EC), a pseudonym certificate (PC), and/or an identification certificate (IC). The EC of the OBE is a certificate used to verify a certificate request, and may serve as a passport of the OBE. The vehicle may request the AA for the PC and/or the IC by using the EC. The EC does not have an encryption key and may be issued while the OBE performs a bootstrap process. Further, the EC has a limited validity period. Therefore, the EC is not valid during an entire operation lifetime of the OBE, and a re-establishment process may be required. Further, each EC may have at least one provider service ID (PSID).

The PC is an authorization certificate that indicates permission of a holder but does not indicate an identity of the holder. The PC may be used for authentication of a V2X message such as a BSM, misbehavior reporting, and the like. The PC does not have an encryption key, and one OBE may have a plurality of valid PCs for privacy. Therefore, the PC may be changed as often as possible if needed.

The IC may be used for authentication in a V2I application. The IC has a provisioning process similar to that of the PC, but may have a PSID and a parameter different from those of the PC.

An infrastructure or an RSE (or RSU) of an infrastructure may have an RSE enrollment certificate (EC) and/or an application certificate (AC).

The EC of the RSE is a certificate used to verify a certificate request, and may serve as a passport of the RSE. The EC may be used to request the AC. Similarly to the EC of the OBE, the EC of the RSE does not have an encryption key and may be issued while the RSE performs a bootstrap process. Further, the EC of the RSE has a limited validity period, similarly to the EC of the OBE. Therefore, the EC is not valid during an entire operation lifetime of the RSE, and a re-establishment process may be required. Further, each EC may have at least one PSID.

The AC may be used by one RSE for authentication and encryption. The AC has an encryption key and does not have privacy constraints for the RSE. Therefore, the RSE may have only one valid AC for a given application at a time. Revocation of the AC according to two periods is exemplified as follows.

1. Short validity periods (e.g., daily or hourly): Since the certificate needs to be renewed frequently, the CRL is not required.

2. Long validity periods (e.g., monthly or annually): The CRL is required.

Figure 7:
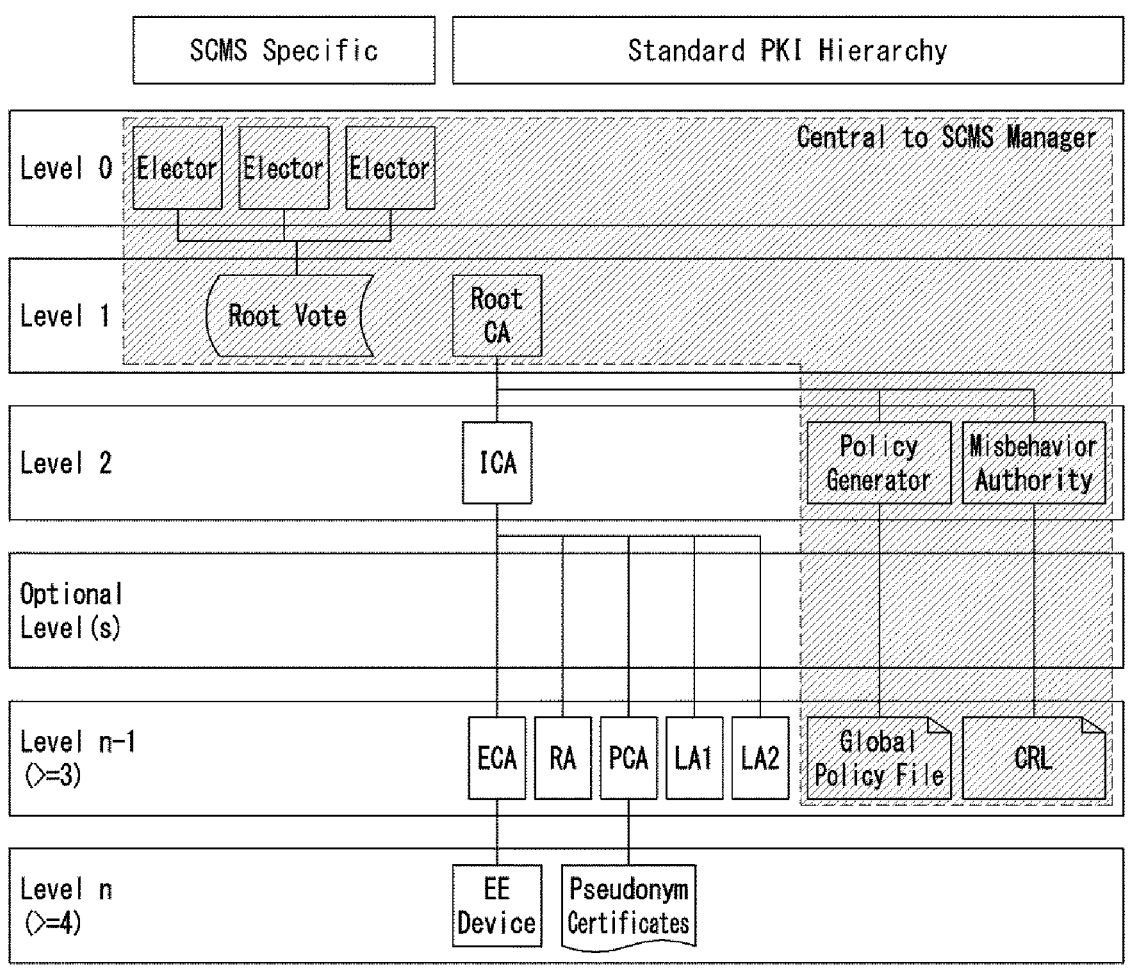
FIG. 7 illustrates a structure of a trust hierarchy according to an embodiment of the present invention.

FIG. 7 illustrates a structure of a trust hierarchy according to an embodiment of the present invention. The embodiment illustrated in FIG. 7 shows an example of a security management system of an elector-based scheme using a certificate format defined by IEEE 1609.2.

According to the embodiment illustrated in FIG. 7, certificates issued by an elector, a root CA, a pseudonym certificate authority (PCA), and an intermediate certificate authority, respectively, are explicit type certificates for supporting peer-to-peer (P2P) distribution. The explicit type certificates keep explicitness to avoid confusion while other certificates are implicit. Further, the explicit type certificates do not have privacy constraints.

In the security management system of the elector-based scheme according to the embodiment illustrated in FIG. 7, electors are added to Level 0, which is the topmost level, such that the root CA may receive a new supporter from the electors without changing a certificate thereof, which is advantageous. The electros may perform a root management function. That is, the electors may be used to manage (e.g., add or delete) the root CA certificate. For example, the electors may add or delete the root CA certificate. Here, a quorum may be, for example, more than half of members. Meanwhile, an elector certificate is not part of a PKI hierarchy of the security management system, and thus a verifying certificate chain does not include a verifying elector certificate.

The root CA certificate is a self-signed certificate that may be used as a trust anchor to verify other certificates, and may be abbreviated to a root certificate. The root CA certificate has the following characteristics different from those of other types of certificates.

1. The trust chain terminates with the root CA certificate. Therefore, verification of all certificates of the security management system terminates with the root CA certificate.

2. A signature of the root CA does not have any encryption value. The signature is generated by the root CA itself.

3. In general, the root CA certificate has a long lifetime. This is because a change of the root CA is an operation that is significantly time consuming and requires a large value.

4. However, only the quorum of electors may generate a root management message and add revocation of the root CA certificate to the CRL.

The ICA certificate may be used to issue a certificate to another SCSM. Only the root CA and the ICA may certify another SCSM. The ICA certificate may be referred to as an IC.

The ECA certificate is an explicit type certificate and may be distributed through P2P distribution. The ECA certificate may be used to issue a certificate (EC) to end entities including an OBE and an RSE. The ECA certificate may be referred to as an EC.

The PCA certificate may be used to issue a certificate to end entities including an OBE and an RSE. The PCA certificate has a limited validity period, and revocation of the PCA certificate may be performed through a CRL issued by a CRL generator. The PCA certificate may be referred to as a PC.

A CRL generator certificate may be issued by the root CA and may be used to sign the CRL. A policy generator certificate may also be issued by the root CA and may be used to sign a global policy file to be distributed to the security management system. A linkage authority (LA) certificate may not interact with an end entity. A registration authority (RA) certificate needs to have a validity period long enough to successfully request certificate provisioning after an end entity is bootstrapped. A misbehavior authority (MA) certificate may not have a long validity period, since an end entity need not frequently retrieve the MA certificate.

Figure 8:
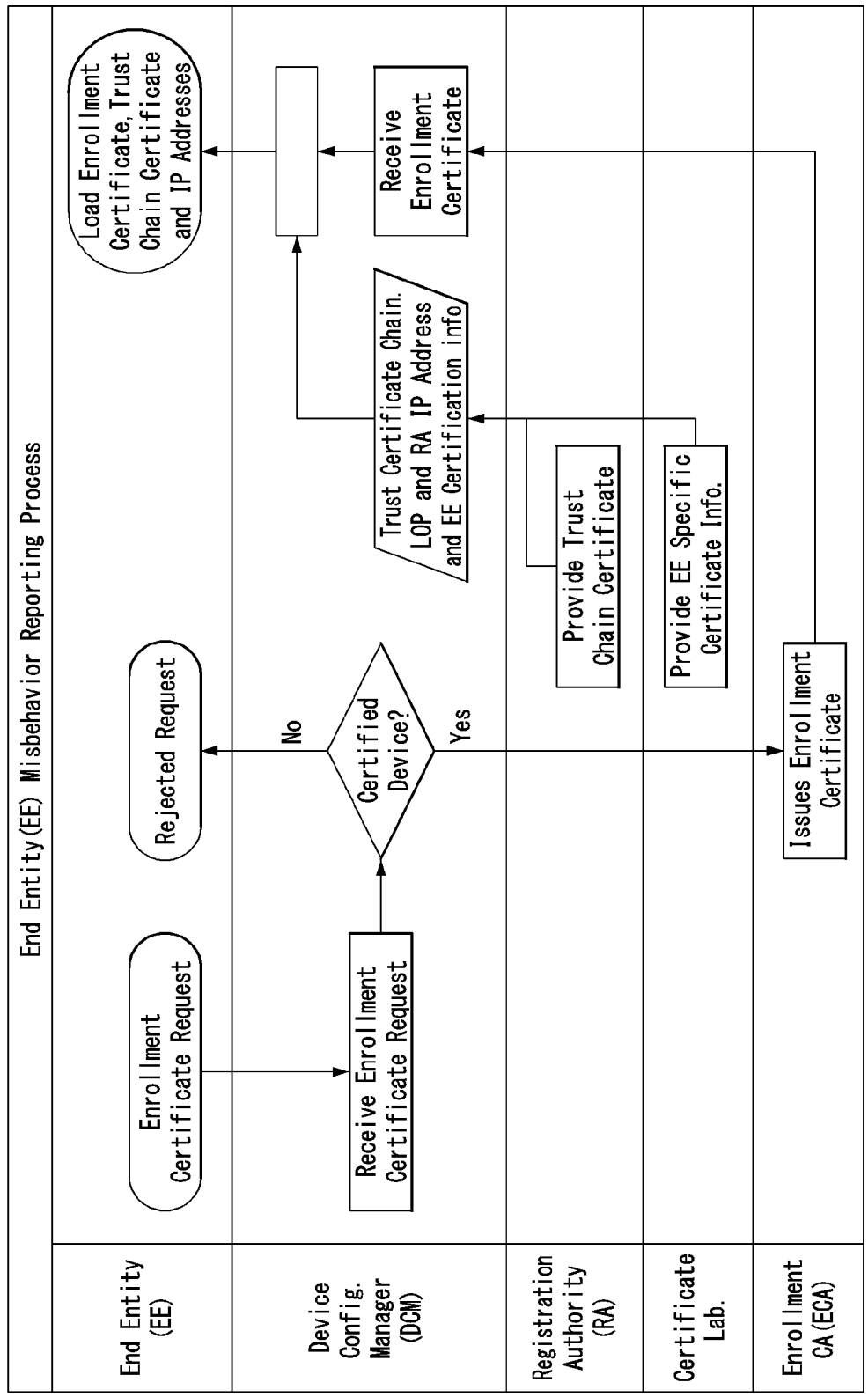
FIG. 8 illustrates a bootstrap process of a V2X communication device operated as an end entity according to an embodiment of the present invention.

FIG. 8 illustrates a bootstrap process of a V2X communication device operated as an end entity according to an embodiment of the present invention. As described above, the EC may be issued by performing such a bootstrap process.

In the present specification, an end entity (EE) may be an entity that is not operated as a CA, that is, an entity requesting a certificate or signing a PDU. For example, a vehicle or an OBE of a vehicle illustrated in FIG. 9 may be operated as the EE.

As illustrated in FIG. 8, in the case in which an EC request is received from the EE, a device configuration manager (DCM) may determine whether or not the corresponding EE is certified. That is, the DCM may determine whether or not the corresponding EE is a certified device. In the case in which the EE is not a certified device, the DCM may reject the EC request.

In the case in which the EE is a certified device, the DCM may request the ECA for an EC. In this case, the ECA may issue the EC and forward the EC to the DCM. The DCM may forward, to the EE, the EC issued by the ECA, a trust chain certificate provided from the RA, and/or EE specific certificate information provided from a certificate lab. At this time, the DCM may also forward an IP address to the EE. The EE may load the EC, the trust chain certificate, and/or the IP address.

Figure 9:
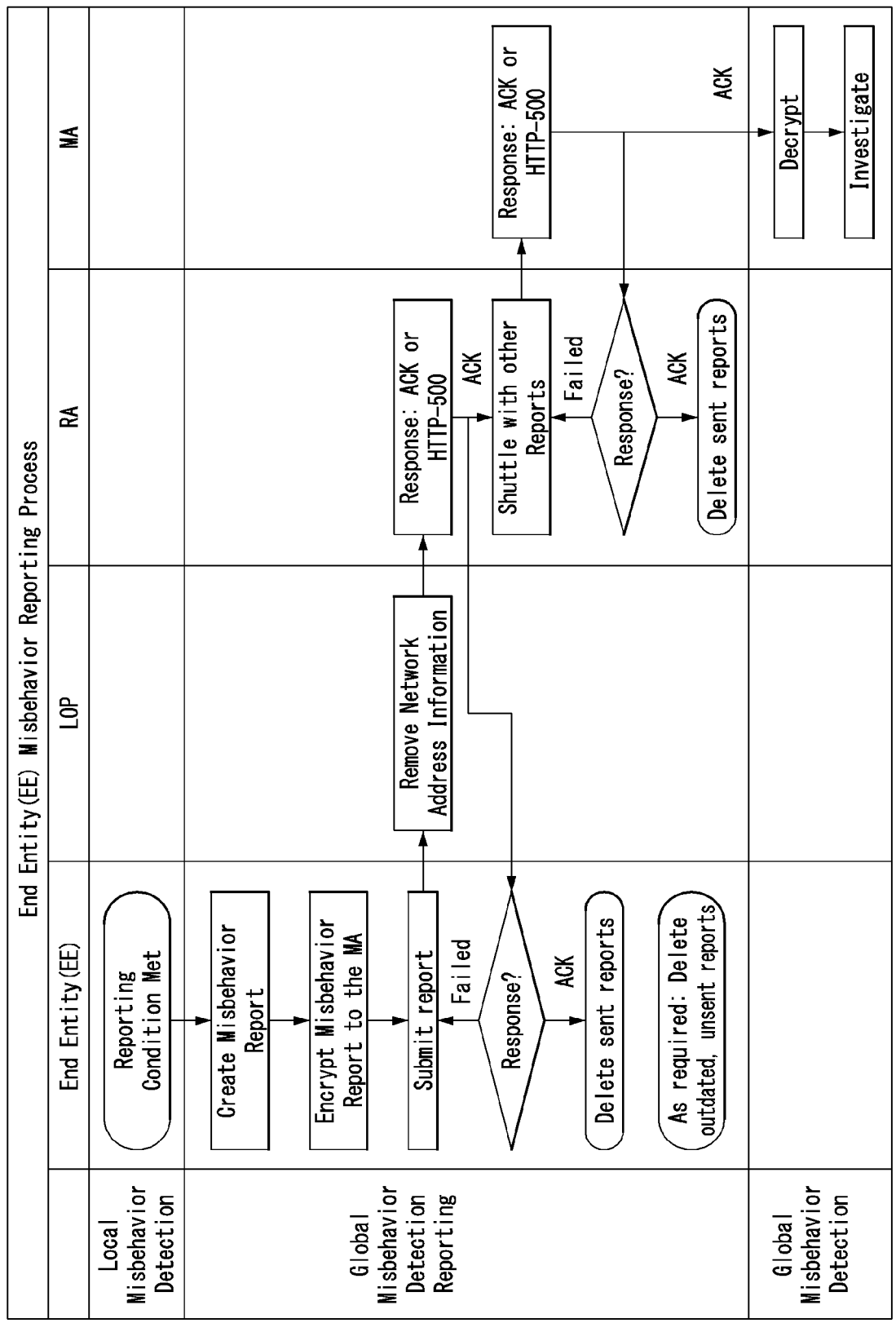
FIG. 9 illustrates a misbehavior reporting process of a V2X communication device operated as an end entity according to an embodiment of the present invention.

FIG. 9 illustrates a misbehavior reporting process of a V2X communication device operated as an end entity according to an embodiment of the present invention. Similarly to the embodiment illustrated in FIG. 8, for example, a vehicle or an OBE of a vehicle may be operated as the EE.

As illustrated in FIG. 9, the EE may report that a preset condition is met (Step 1).

The EE may create a misbehavior report. At this time, the EE may sign the misbehavior report by using the PC (Step 2).

The EE may encrypt the misbehavior report to be sent to the MA (Step 3).

The EE may submit the misbehavior report to the RA (Step 4).

At this time, a location obscurer proxy (LOP) may remove network address information (e.g., an MAC address and/or an IP address) from the encrypted misbehavior report, and then forward the misbehavior report to the RA (Step 4.1). The RA may shuffle the misbehavior report with other reports and forward the shuffled reports to the MA (Step 4.2). Here, a shuffling threshold may be, for example, 10,000 misbehavior reports or one day.

The MA may decrypt the misbehavior report and perform investigation based on the decrypted misbehavior report.

If an ACK response is received from the RA, the EE may delete the sent reports. Further, the EE may delete an outdated or unsent report. Further, if an ACK response is received from the MA, the RA may delete the sent reports.

Table 1 shows security-related services and PSIDs of the services in U.S.

TABLE 1

| ITS service (application) | |
|---|---|
| Numerical value | Description |
| 32 = 0 × 20 | BSM PSID |
| 35 = 0 × 23 | Security Manamgement PSID |
| 38 = 0 × 26 | Misbehavior Reporint PSID |
| 135 = 0 × 87 | WAVE WSA |
| 136 = 0 × 88 | Peer To Peer Certificate Distribution PSID |

Figure 10:
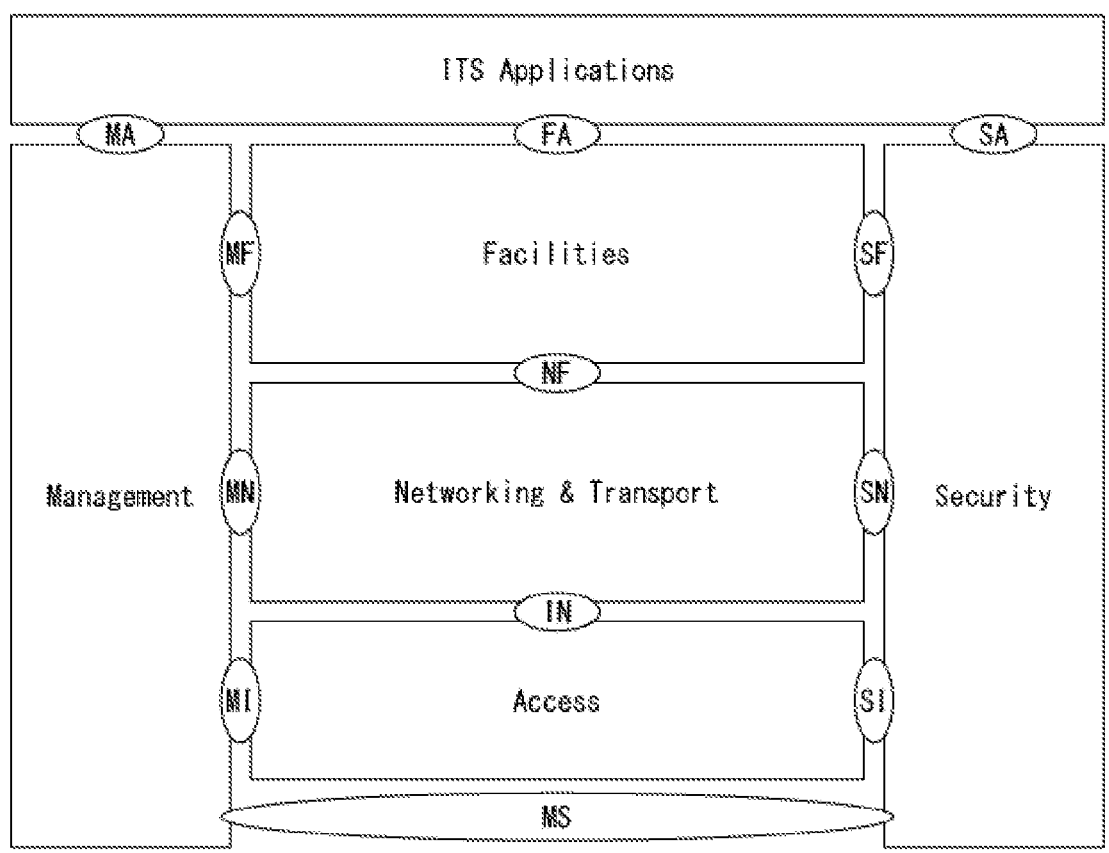
FIG. 10 illustrates a protocol stack of a V2X communication device providing a security service according to a second embodiment of the present invention.

FIG. 10 illustrates a protocol stack of a V2X communication device providing a security service according to a second embodiment of the present invention. According to an embodiment illustrated in FIG. 10, the V2X communication device may be a V2X communication device (e.g., ITS station) providing a security service based on the ETSI ITS standard in Europe. The security service in FIG. 10 may be referred to as an ITS security service, and a security layer in FIG. 10 may be referred to as an ITS security layer.

FIG. 10 shows functional entities of an ITS security architecture and a relationship between the functional entities and ITS communication layers. FIG. 10 shows the security layer as a vertical layer adjacent to the ITS communication layers, but, in fact, the security service is provided on a layer-by-layer basis. Therefore, the security layer may be subdivided into ITS layers. Such a security service may be provided on a layer-by-layer basis in a manner in which each security service is operated in one or several ITS architecture layers, or in a security management layer. As illustrated in FIG. 10, the functional entities of the ITS security architecture and the ITS communication layers may perform communication through a SAP (e.g., SF-SAP, SN-SAP, and SI-SAP).

Figure 11:
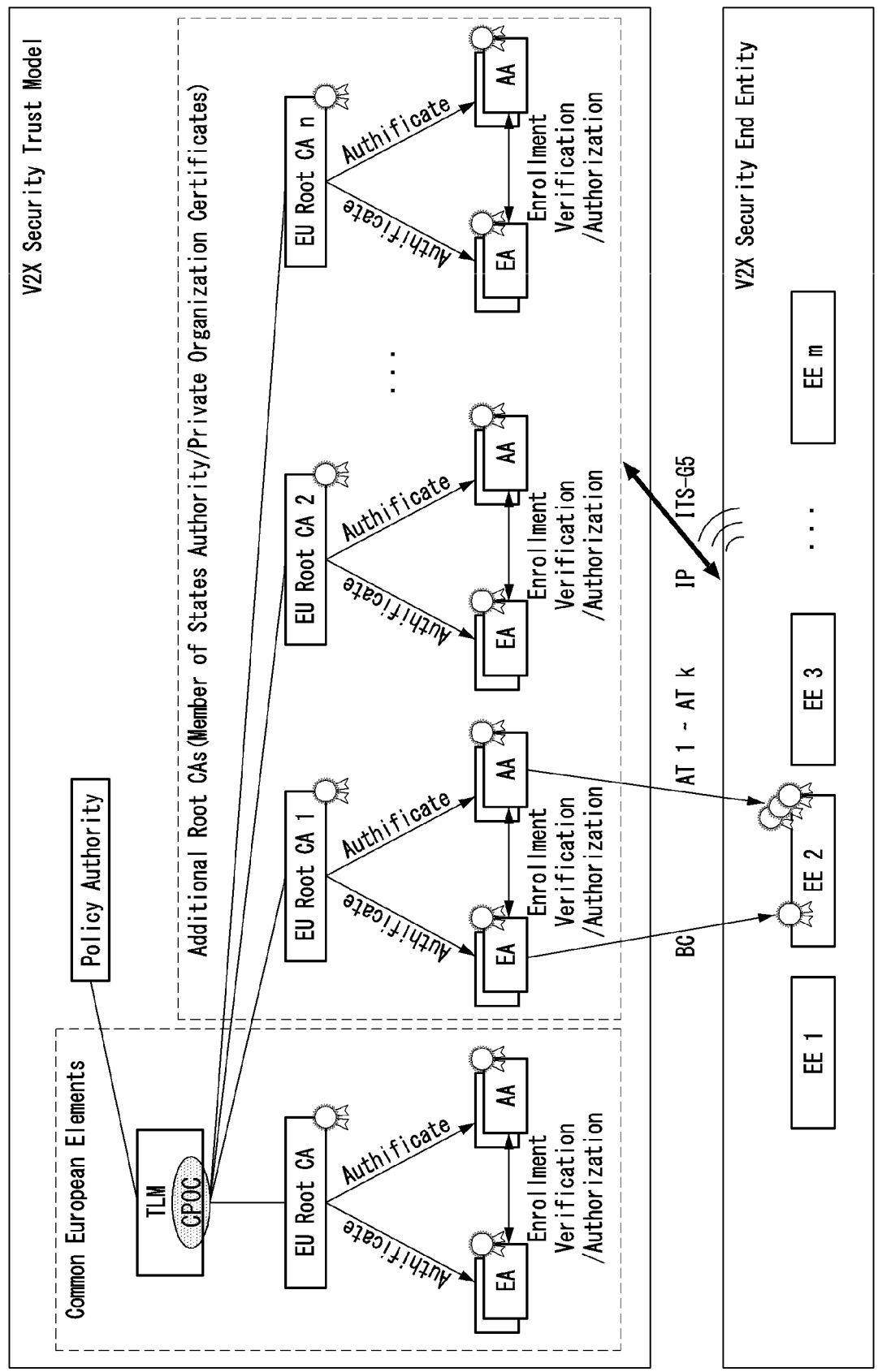
FIG. 11 illustrates a trust model of a V2X communication system according to an embodiment of the present invention.

FIG. 11 illustrates a trust model of a V2X communication system according to an embodiment of the present invention. A description of the embodiment illustrated in FIG. 11 overlapping with the description provided with reference to FIG. 2 will be omitted. The trust model according to the embodiment illustrated in FIG. 11 may be referred to as an ITS trust model or a C-ITS trust model.

According to an embodiment of FIG. 11, the V2X communication system may be a security system required for V2X communication devices (e.g., an ITS station) to safely send and receive a message for V2X communication. Such a V2X communication system may include one or more entities for trusted communication for a message. For example, the V2X communication system may include a policy authority (PA), a trust list manager (TLM), at least one root CA, an EA, an AA, and/or at least one V2X communication device, as illustrated in FIG. 11. According to an embodiment, the V2X communication device may be an OBE, or an RSE. The root CA, the EA, and the AA have been described above with reference to FIG. 2, and thus the PA, the TLM, and the like will be described below.

A representative of public and private interested parties (e.g., a public institution, a road operator, and a vehicle manufacturer) participating in the ITS trust model acts as the PA.

The PA may designate the TLM. Specifically, the PA may designate and authorize the TLM and a central point of contact (CPOC) for operation in the ITS trust system. The PA may determine whether or not the root CA is trustable, and notifies the TLM of approved/revoked root CA certificates to approve/cancel root CA operation in an ITS trust domain. In other words, the PA may grant the root CA operation and perform confirmation so that the TLM may trust the root CA.

The TLM serves to generate and sign a list of the root CA certificates and TLM certificates. The signed list issued by the TLM may be referred to as an European certificate trust list (ECTL). As such, the TLM may issue the ECTL and the ECTL may provide trust for approved root CAs.

The CPOC is a unique entity designated by the PA, and serves to guarantee communication exchange between the root CAs, collect the root CA certificates, and provide the collected root CA certificates to the TLM. The CPOC also serves to distribute the ECTL to any entity of interest in the trust model. According to an embodiment the TLM may store security certificate information and trust list information (ECTL) in a local storage. In this case, the CPOC may be used to distribute such an information to all PKI participants.

The EA may forward the EC to the ITS station (EE) to provide trust for operation of the EE. The AA may issue the ATs to the ITS stations having trust from the EA. Therefore, a receiving ITS station or a sending ITS station may trust another ITS station. This is because the ATs are issued by the AA, the corresponding AA is certified by the root CA for trustability, and the root CA is certified by the TLM and the PA.

Figure 12:
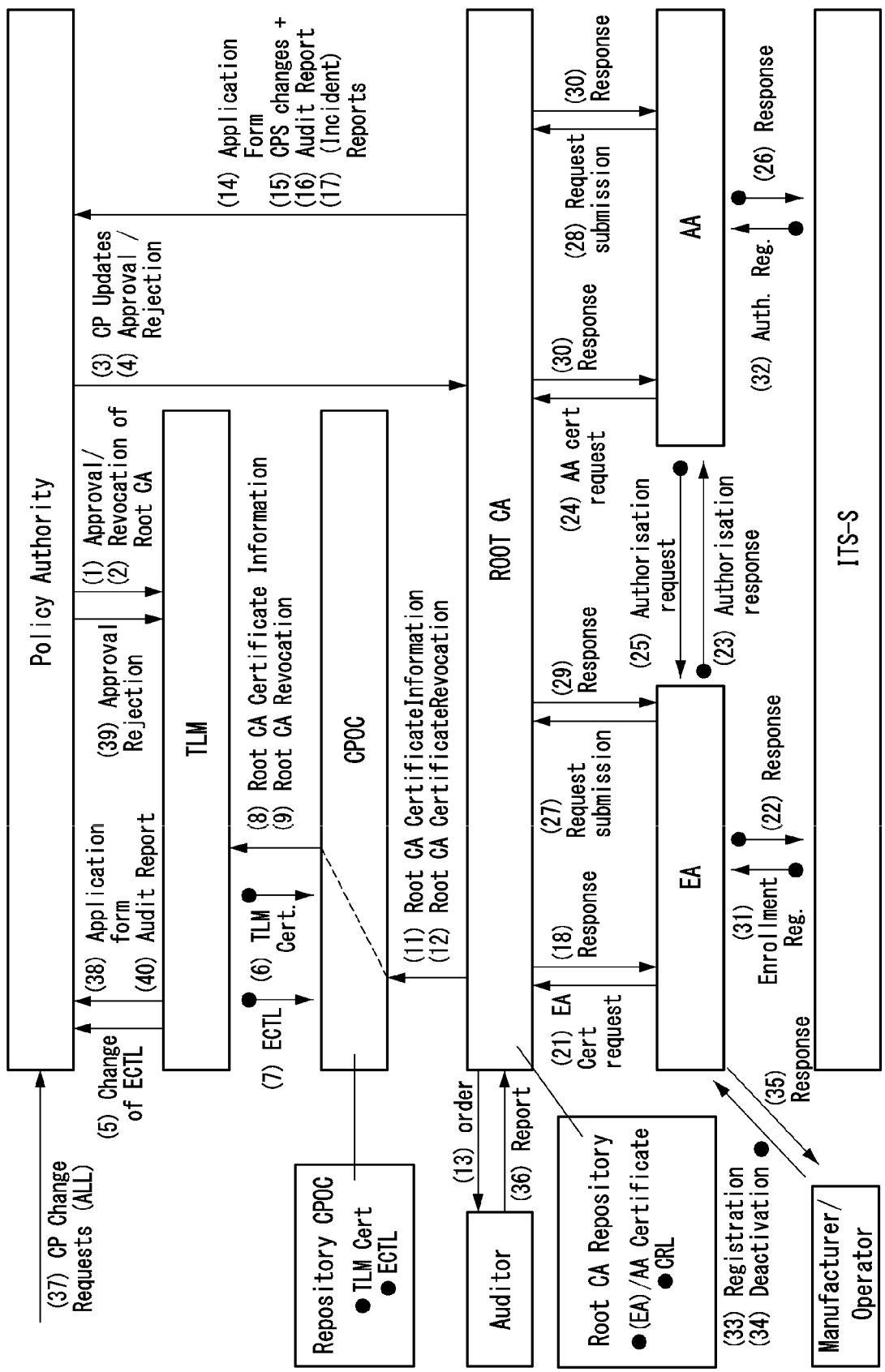
FIG. 12 illustrates a flow of information in a trust model of a V2X communication system according to an embodiment of the present invention.

FIG. 12 illustrates a flow of information in a trust model of a V2X communication system according to an embodiment of the present invention. Specifically, FIG. 12 illustrates a flow of information in a trust model of an ITS station participating in the PKI. In the embodiment illustrated in FIG. 12, it is basically assumed that there are multiple root CAs. Certificates of the root CAs may be periodically sent to a CPOC through a security protocol such as a link certificate. Here, a security protocol to be used may be defined in the CPOC.

Referring to (1) and (2) in FIG. 12, a PA may perform an approval of a root CA application with respect to a TLM, and may provide information regarding revocation of a root CA. Referring to (3) and (4) in FIG. 12, the PA may update a certification policy (CP), and approve or reject a root CA application form/certificate practice statement (CPS) request change/audit process.

Referring to (5) in FIG. 12, the TLM may notify the PA of a change of an ECTL. Referring to (6) and (7) in FIG. 12, the TLM may provide TLM certificates and the ECTL to a C-ITS point of contact (CPOC).

Referring to (8) and (9) in FIG. 12, the CPOC may forward root CA certificate information and root CA revocation to the TLM. Referring to (10) in FIG. 12, the CPOC may forward the TLM certificates to all EEs.

Referring to (11) and (12) in FIG. 12, the root CA may forward root CA certificate information and root CA certificate revocation to the CPOC. Referring to (13) in FIG. 12, the root CA may forward an audit order to an auditor. Referring to (14), (15), and (16) in FIG. 12, the root CA may forward an application form, update CPS changes, and provide an audit report.

Figure 13:
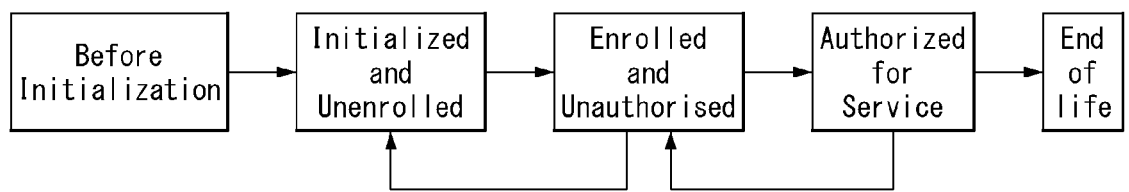
FIG. 13 illustrates a security life cycle of a V2X communication device according to an embodiment of the present invention.

FIG. 13 illustrates a security life cycle of a V2X communication device according to an embodiment of the present invention. According to an embodiment illustrated in FIG. 13, the V2X communication device may be an ITS station based on the ETSI ITS standard. A security lifecycle of FIG. 13 may be referred to as an ITS-S security life cycle.

Referring to FIG. 13, the security life cycle may include an initial ITS station configuration step during manufacturing, an enrollment step, an authorization step, an operation and maintenance step, and a lifetime expiration step.

In the initial ITS station configuration step as part of a manufacturing process, an identity of the station and relevant information elements need to be set in the ITS station itself or the EA. For example, the information elements in the ITS station may include a unique identifier, contact information (e.g., a network address and a public key certificate) with respect to the EA and the AA that may issue a certificate for the ITS station, a set of currently known trusted EA certificates that may be used by the ITS station to start an enrollment procedure, a set of currently known trusted AA certificates that may be used by the ITS station to trust communication with another ITS station, and/or public/private key pairs for encryption, a trust anchor (root CA) public key, and a DC network address. Alternatively, the information elements in the EA may include a permanent identifier of the ITS station, profile information regarding the ITS station, and/or a public key from key pairs belonging to the ITS station.

In the enrollment step, the ITS station may request the EA for an EC. After a successful enrollment procedure, the ITS station may process enrollment credentials to be used for the following authentication request. In the case in which the EA updates the EC, the ITS station needs to forward an enrollment request signed by the previous valid enrollment credentials issued by the EA.

In the authorization step, the ITS station may request the AA for an AT. In the case of a "service authorization" state, the ITS station may have a set of ATs permitting sending of a signed message to another ITS station without revealing the identity or the enrollment credentials of the sending ITS station. When complete sets of the ATs run out, the ITS station may not sign sending of a message to another ITS station, and may return to the enrolled state.

In the maintenance step, if the EA or AA is added to or eliminated from the system, the root CA may notify the ITS station of such a change.

The lifetime expiration step may be performed when a lifetime of the ITS station is expired or a negotiation (revocation determined by the issuing EA) occurs. In the lifetime expiration step, the ITS station is revoked and operation needs to be stopped in the ITS G5 communication network.

As described above, in the V2X communication system, a PKI-based trust model may be used to guarantee authentication of a V2X communication device (e.g., ITS station or WAVE device) and trustability of a V2X message (e.g., ITS message) sent and received by the V2X communication device. Certificates such as an EC (or LTC) and AT (or PC) are present in the trust model and each of the certificates may be used to authenticate the V2X communication device and the V2X message.

At this time, in the case in which a misbehavior of the V2X communication device is detected, security credentials of the corresponding V2X communication device, such as the EC/AT, need to be revoked and the corresponding V2X communication device needs to be excluded from the V2X communication. To this end, a method for generating and distributing a CRL to efficiently distribute misbehavior detection information is required. For example, in United States, a misbehavior authority (MA) is added to the trust model, and the MA may broadcast the CRL for the EE. In Europe, the root CA may generate a CRL for the CA, together with a certificate trust list (CTL). At this time, the root CA may generate and issue the CRL and the CTL in a form of signed lists, and forward the CRL and the CTL to a distribution center (DC). In this case, the V2X communication device may acquire information regarding a certificate revocation status by using the Internet protocol such as an online certificate status protocol (OCSP), and the DC may distribute the information to all EEs in a domain managed by a corresponding RCA.

Such a conventional method requires backend-connection with an infrastructure (e.g., RSU) for actual operation. Therefore, in the case in which there is no infrastructure around, the EE may not receive relevant information until entering into the next infrastructure region. Further, in the case of the MA in United States or the DC in Europe, there need to be multiple MAs or DCs for actual operation, rather than only one MA or DC. Therefore, a mechanism thereof becomes significantly complicated. Further, even in the case in which only one MA or DC is provided for operation, if the operated MA is hacked, all V2X communication is affected. Therefore, it is possible to implement safe V2X communication.

Hereinafter, a misbehavior detection distribution (MDD) technology for excluding a misbehavior detection (MBD) device performing a misbehavior by more effectively forwarding a detected misbehavior to perform trusted V2X communication in the V2X communication system. In order to solve the above-described problem of the conventional method, three main technical characteristics will be described below.

First, a misbehavior broker (MBB) is introduced. For example, a specific V2X communication device in the V2X communication system is designated as the MBB and the designated V2X communication device may have a special permission for MBB operation when the EC is issued. Therefore, the V2X communication device designated as the MBB needs to satisfy more demanding requirements for enhanced security/performance, in comparison to a general V2X communication device, and may be certified as the MBB. The V2X communication device certified as the MBB may be a vehicle or a non-vehicle such as an infrastructure. That is, the V2X communication device certified as the MBB serves as a local police for a V2X communication device performing a misbehavior to control regions and problems that may not be solved by the MA/DC serving as a national police. In this case, the V2X communication device certified as the MBB may perform a primary operation corresponding to the permission thereof with respect to a misbehavior in a region in which the V2X communication device certified as the MBB is present, thereby preventing a problem in the V2X communication from occurring.

One of main functions of the MBB is to have a special permission/certification to receive MBD information from a surrounding V2X communication device and forward the MBD information to the MA/DC. Here, the MBB may include one or more communication modules that may perform long distance communication such as cellular/satellite/broadcasting communication, in addition to a communication module that may perform short distance communication, such as a DSRC module, in order to increase functional efficiency and flexibility. An MBB mode in which such a function is performed may be referred to as an MBB long distance (LD) mode. The MBB LD mode may also be referred to as a first MBB mode or a first mode.

Second, there is an MBB CO mode. The MBB CO mode may also be referred to as a second MBB mode or a second mode.

In the MBB CO mode, the MBB may serve not only to forward MBD information to the MA/DC, but also to generate/issue the CRL. The issued CRL may be sent to a predetermined MA or DC. Therefore, even in the case in which there is no infrastructure such as an RSU around, or long distance communication such as cellular communication is not possible, the MBB may collect MBD information, generate/issue the CRL, and send the CRL when the MA/DC is in a connectable state. In this way, the MBD information may be notified to the MA/DC as soon as possible.

Third, there is an MBB CB mode. The MBB CB mode may also be referred to as a third MBB mode or a third mode.

In the MBB CB mode, the MBB may collect the MBD information, generate/issue the CRL, broadcast the CRL to surrounding EEs, and serve as an OSCP server in the case of the OSCP method described above. In this case, even in the case in which there is no infrastructure such as an RSU around, the EE may receive the CRL through V2X communication such as V2V, V2I, or V2P communication, or may verify a certificate status and revoke the EC/AT or the like of the EE determined as the MBD device. As a result, safe V2X communication becomes possible. In the case in which a blockchain technology is applied to generate and maintain the CRL, all MBBs may have all added CRL lists and distribution processing is performed, such that the MBB may replace the MA/DC. As such, in the case in which multiple MAs/DCs are maintained by using the blockchain technology, even if a specific MA/DC is attacked, since there is another MA/DC, V2X communication is not affected.

In order to implement the V2X communication system having the above-described characteristics, in the present specification, the MBB may be included as a new component/entity of the security management system. Further, for operation, the MBB may broadcast a message for notifying of a surrounding V2X communication device that it is an MBB, with a format of a V2X message such as a CAM and a BIM. As a response thereto, the receiving V2X communication device may send, to the MBB, MBD information thereof with a format of a V2X message such as a DENM when a misbehavior of the receiving V2X communication device is detected through a local misbehavior detection (LMD) function. Further, the MBB may have a global misbehavior detection (GMD) function. In this case, the MBB may analyze V2X communication with surrounding V2X communication devices through the GMD function to directly detect misbehaviors of the surrounding V2X communication devices.

In order to implement the above-described technical characteristics, for example, an MBB satisfying the following requirements may be included in the V2X communication system.

The MBB has enough performance for collecting/broadcasting a message and optional GMD.

The MBB has enough memory and secure memory for collecting/broadcasting a message and optional GMD.

The MBB shall be satisfied with a pre-decided trust level.

The MBB shall have multiple network modules and one of them supports a long distance network such as cellular and broadcasting (e.g., two DSRC modules and one cellular module).

Hereinafter, a V2X communication system having the MBB added will be described with reference to FIG. 14.

Figure 14:
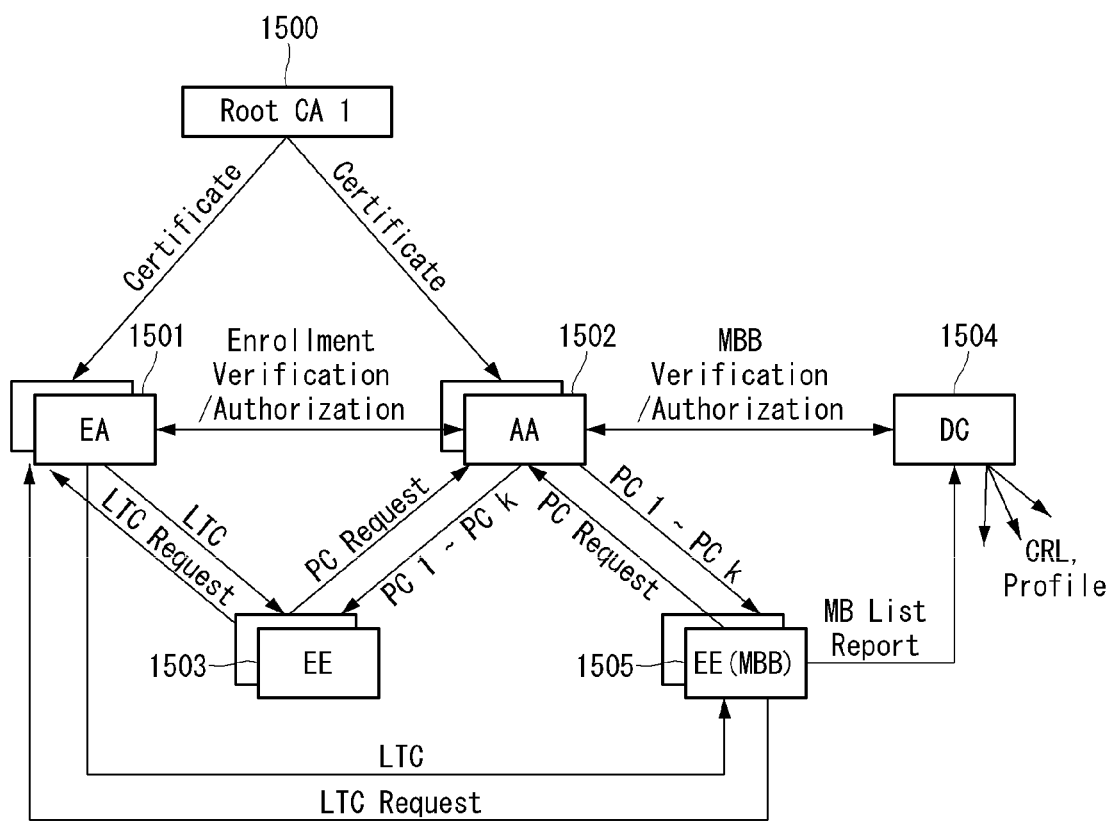
FIG. 14 illustrates a V2X communication system having a misbehavior broker (MBB) added according to an embodiment of the present invention.

FIG. 14 illustrates a V2X communication system having the MBB added according to an embodiment of the present invention. According to an embodiment illustrated in FIG. 14, the V2X communication system may be an European security system including an ITS station, but is not limited thereto. The V2X communication system may also be a security communication system of United States. As illustrated in FIG. 14, the MBB may be operated based on a PKI system. According to the embodiment illustrated in FIG. 14, the V2X communication system may include a root CA, an EA, an AA, at least one EE, and a DC distributing a CRL. Here, the at least one EE may include an EE designated as the MBB.

Referring to FIG. 14, the root CA may certify the EA and the AA, and the EE may receive an LTC/EC through the EA. Here, the EE designated as the MBB may be certified as the MBB through an additional certification procedure, and may receive an EC having MBB permission. In this case, since a PC/AT is received and used through the MBB certification, the EE certified as the MBB may send and receive a V2X message through an AT having MBB permission, and thus may perform an operation different from that of another general EE.

As described above, operation of the MBB may have the following four types according to the MBB mode applied to the MBB.

Figure 15:
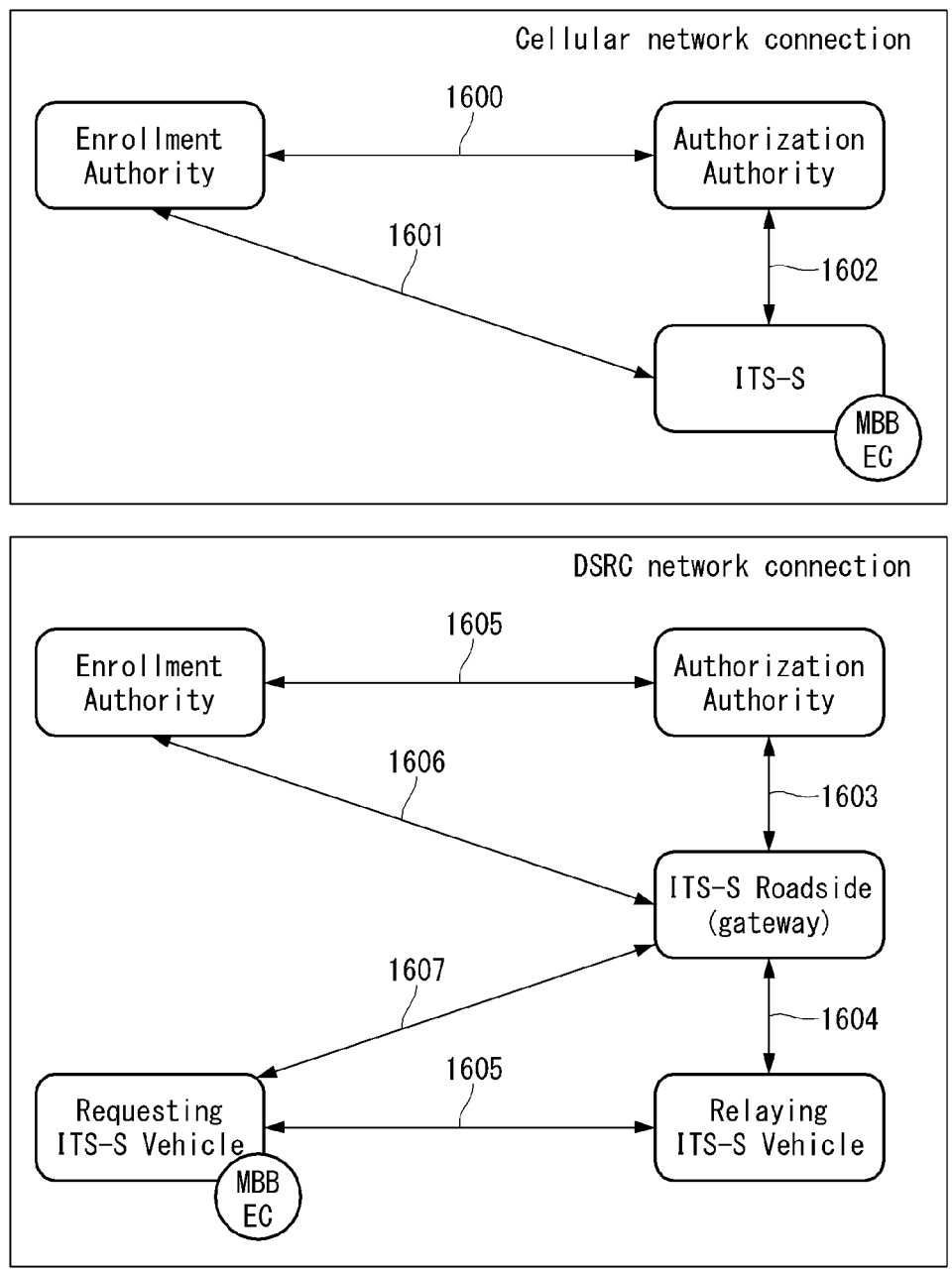
FIG. 15 illustrates a method in which a V2X communication device performs V2X communication through a long distance communication network or a short distance communication network according to an embodiment of the present invention.

Type 1: No MBB
Type 2: MBB with LD mode
Type 3: MBB with CO mode
Type 4: MBB with CB mode FIG. 15 illustrates a method in which a V2X communication device performs V2X communication through a long distance communication network or a short distance communication network according to an embodiment of the present invention. Specifically, a method in which a V2X communication device performs V2X communication by using long distance communication network connection such as cellular network connection, or short distance communication network connection such as DSRC network connection according to the embodiment is illustrated in FIG. 15. According to the embodiment illustrated in FIG. 15, the V2X communication device may be an ITS station.

In the case in which the cellular network connection is used as illustrated in FIG. 15(a), the V2X communication device may directly approach the EA to receive the EC from the EA. At this time, in the case in which the V2X communication device is certified as the MBB, the EC may have permission (MBB permission) as the MBB. In this case, there may be various types of permissions such as LD, CO, and CB according to the MBB mode. Further, in the case in which the V2X communication device requests a PC/AT by using the EC having the MBB permission, the AA may check the EA and then issue the AT. At this time, the AT may have MBB permission.

In the case in which the DSRC network connection is used as illustrated in FIG. 15(b), the V2X communication device may not directly approach the EA and the AA. Therefore, as illustrated, the V2X communication device may approach the EA and the AA through the RSU (ITS-S roadside) or through the RSU (ITS-S roadside) via another ITS station (relaying ITS station). In this way, the ITS station may receive the EC and PC/AT having the MBB permission.

Figure 16:
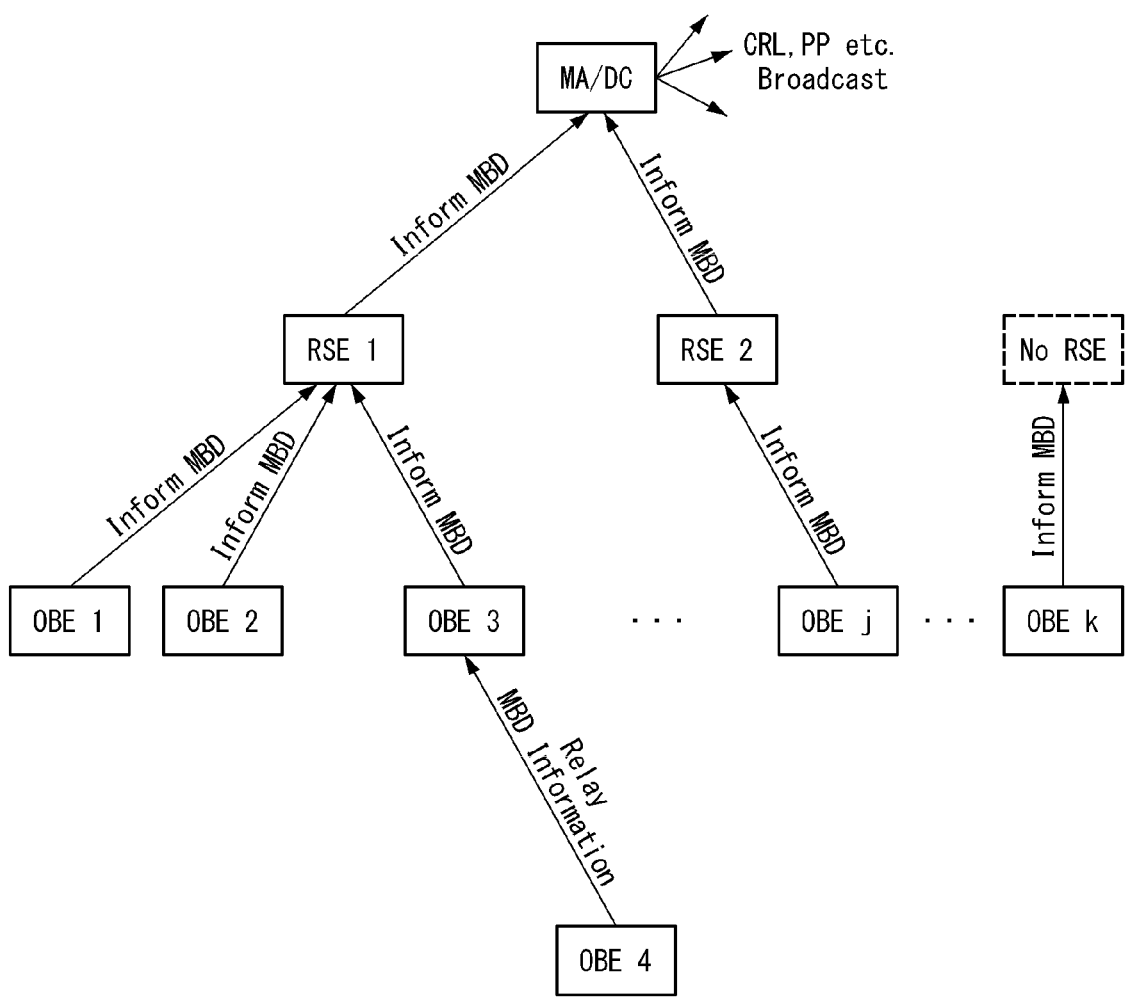
FIG. 16 illustrates a method in which a V2X communication device collects and provides misbehavior detection (MBD) information according to an embodiment of the present invention.

FIG. 16 illustrates a method in which a V2X communication device collects and provides MBD information according to an embodiment of the present invention. In the embodiment illustrated in FIG. 12, it is assumed that the V2X communication system does not include a V2X communication system operated as the MBB.

In the embodiment illustrated in FIG. 16, it is assumed that a V2X communication device (vehicle V2X communication device) corresponding to the OBE does not support a long distance network. Therefore, in the case in which a V2X communication device (infrastructure V2X communication device) corresponding to the RSE is present within a communication range, the vehicle V2X communication device may directly provide MBD information to the infrastructure V2X communication device. In this case, the infrastructure V2X communication device may forward the received MBD information or may directly generate the MBD information and provide the generated MBD information to the MA/DC. Then, the MA/DC may generate the CRL by using at least one received MBD information and broadcast the generated CRL.

However, in the case in which the infrastructure V2X communication device is not present within the communication range, the vehicle V2X communication device may provide the MBD information to the infrastructure V2X communication device through another vehicle V2X communication device within the communication range. However, in the case in which the infrastructure V2X communication device and another vehicle V2X communication device are not present within the communication range of the vehicle V2X communication device like OBE k, the vehicle V2X communication device may not provide the MBD information to the infrastructure V2X communication device. Therefore, in order to solve such a problem, the V2X communication device needs to support the long distance network function. That is, a V2X communication device operated as the MBB needs to include the MBB LD mode as one of the MBB modes.

Figure 17:
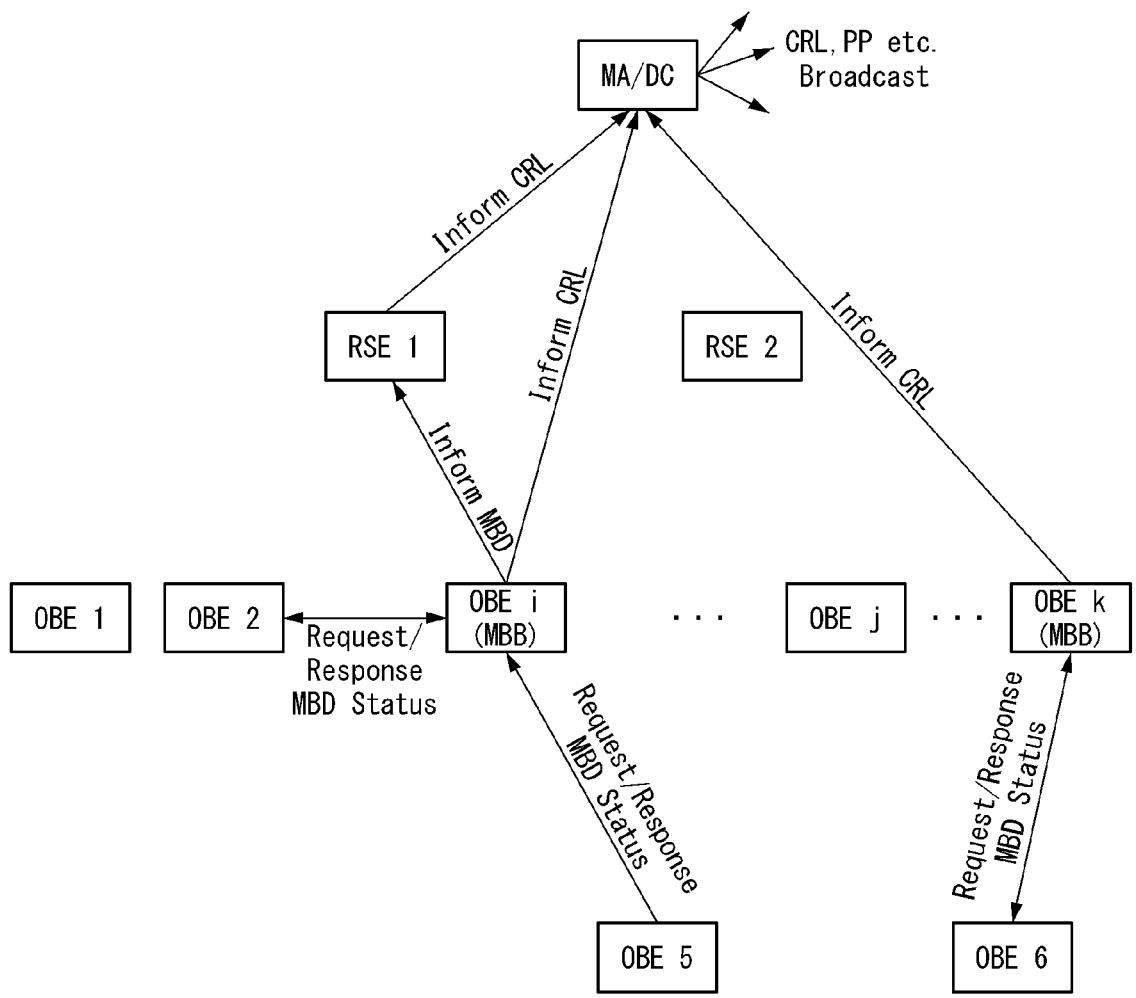
FIG. 17 illustrates a method in which a V2X communication device operated in an MBB CO mode collects and provides MBD information according to an embodiment of the present invention.

FIG. 17 illustrates a method in which a V2X communication device operated in the MBB CO mode collects and provides MBD information according to an embodiment of the present invention.

A V2X communication device (MBB V2X communication device) operated as the MBB may request a surrounding V2X communication device for MBD information (e.g., MBD status information) and receive a response message thereto from the surrounding V2X communication device. At this time, the response message may include an MBD report (MBDR). In this case, the MBB V2X communication device may generate a CRL based on the MBDR.

In the embodiment illustrated in FIG. 17, it is assumed that OBE i and OBE k are MBB V2X communication devices, and OBE 5 and OBE 6 are V2X communication devices each of which a misbehavior is detected. Further, it is assumed that the MBB V2X communication device is operated in the MBB CO mode. In the MBB CO mode, the MBB V2X communication device may generate the CRL and forward the CRL to the MA/DC. However, in the MBB CO mode, the MBB V2X communication device may not directly broadcast the CRL to the surrounding V2X communication device.

Referring to FIG. 17, the MBB V2X communication device may receive an MBDR including MBD information from the surrounding V2X communication device. For example, OBE i may request OBE 5 for MBD information, and may receive a MBDR from OBE 5 as a response to the request. As another example, OBE k may request OBE 6 for MBD information, and may receive an MBDR from OBE 6 as a response to the request.

The MBB V2X communication device may generate a CRL based on the received MBDR. For example, OBE i and OBE k may generate CRLs based on the MBDRs received from OBE 5 and OBE 6, respectively. Further, the MBB V2X communication device may directly provide the CRL to the MC/DC through a surrounding RSE or through a long distance network such as a cellular network. For example, OBE i may directly send the CRL to the MC/DC through RSE 1 or through a cellular network. As another example, OBE k may directly send the CRL to the MC/DC through a cellular network. Then, the MA/DC may generate a final CRL based on the received CRLs and broadcast the generated final CRL.

Figure 18:
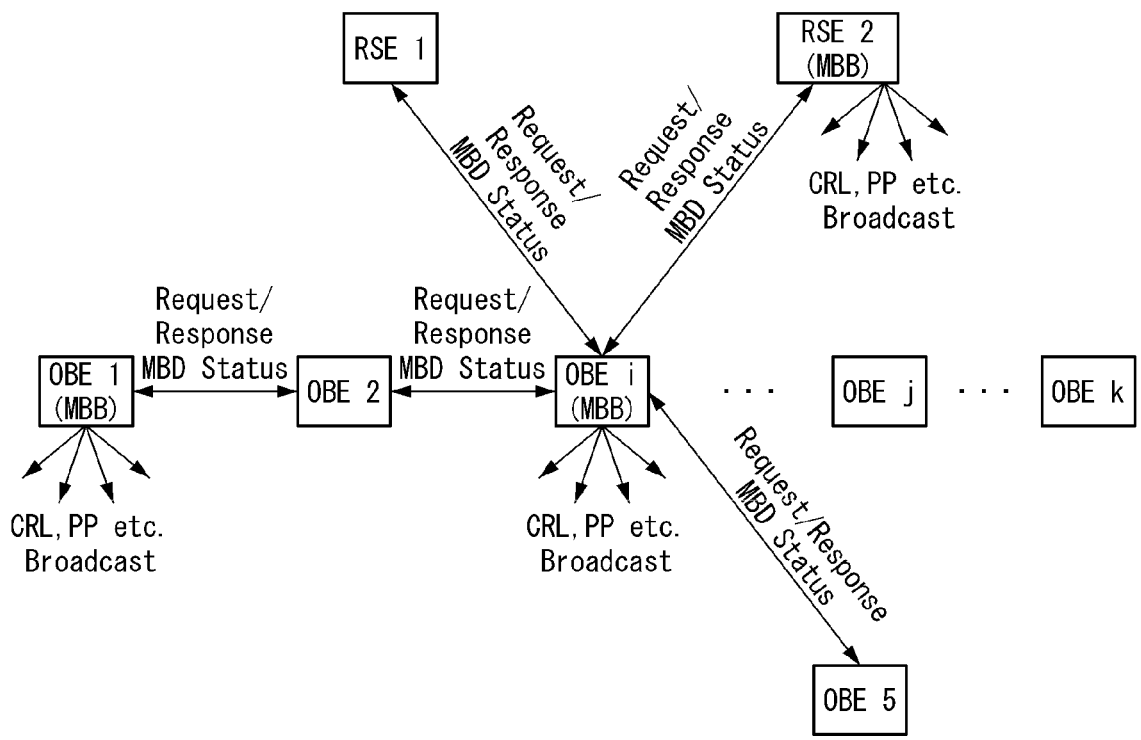
FIG. 18 illustrates a method in which a V2X communication device operated in an MBB CB mode collects and provides MBD information according to an embodiment of the present invention.

FIG. 18 illustrates a method in which a V2X communication device operated in the MBB CB mode collects and provides MBD information according to an embodiment of the present invention.

As described with reference to FIG. 17, a V2X communication device (MBB V2X communication device) operated as the MBB may request a surrounding V2X communication device for MBD information (e.g., MBD status information) and receive a response message thereto from the surrounding V2X communication device. At this time, the response message may include an MBD report (MBDR). In this case, the MBB V2X communication device may generate a CRL based on the MBDR.

In the embodiment illustrated in FIG. 18, it is assumed that OBE 1, OBE i, and RSE 2 are MBB V2X communication devices, and OBE 5 and OBE i are V2X communication devices each of which a misbehavior is detected. Further, it is assumed that the MBB V2X communication device is operated in the MBB CB mode. In the MBB CB mode, the MBB V2X communication device may generate the CRL and directly forward the CRL to the surrounding V2X communication device. In other words, unlike in the MBB CO mode, the MBB V2X communication device may generate the CRL and directly distribute the CRL to the surrounding V2X communication device without going through the MA/DC in the MBB CB mode.

Referring to FIG. 18, the MBB V2X communication device may receive an MBDR including MBD information from the surrounding V2X communication device. For example, OBE i may request OBE 5 for MBD information, and may receive a MBDR from OBE 5 as a response to the request. As another example, RSE 2 may request OBE i for MBD information, and may receive an MBDR from OBE i as a response to the request.

The MBB V2X communication device may generate a CRL based on the received MBDR and directly broadcast the CRL. For example, OBE 1, OBE I, and OBE k may generate CRLs based on the MBDRs received from OBE 5 and OBE 6, respectively, and directly broadcast (or distribute) the CRL to the surrounding V2X communication device. As a result, the conventional MC/DC may be replaced with multiple MBB V2X communication devices, and even in the case in which some of the MBB V2X communication devices are revoked due to detection of a misbehavior or the like, stable V2X communication and CRL distribution by another MBB V2X communication device may be performed.

Figure 19:
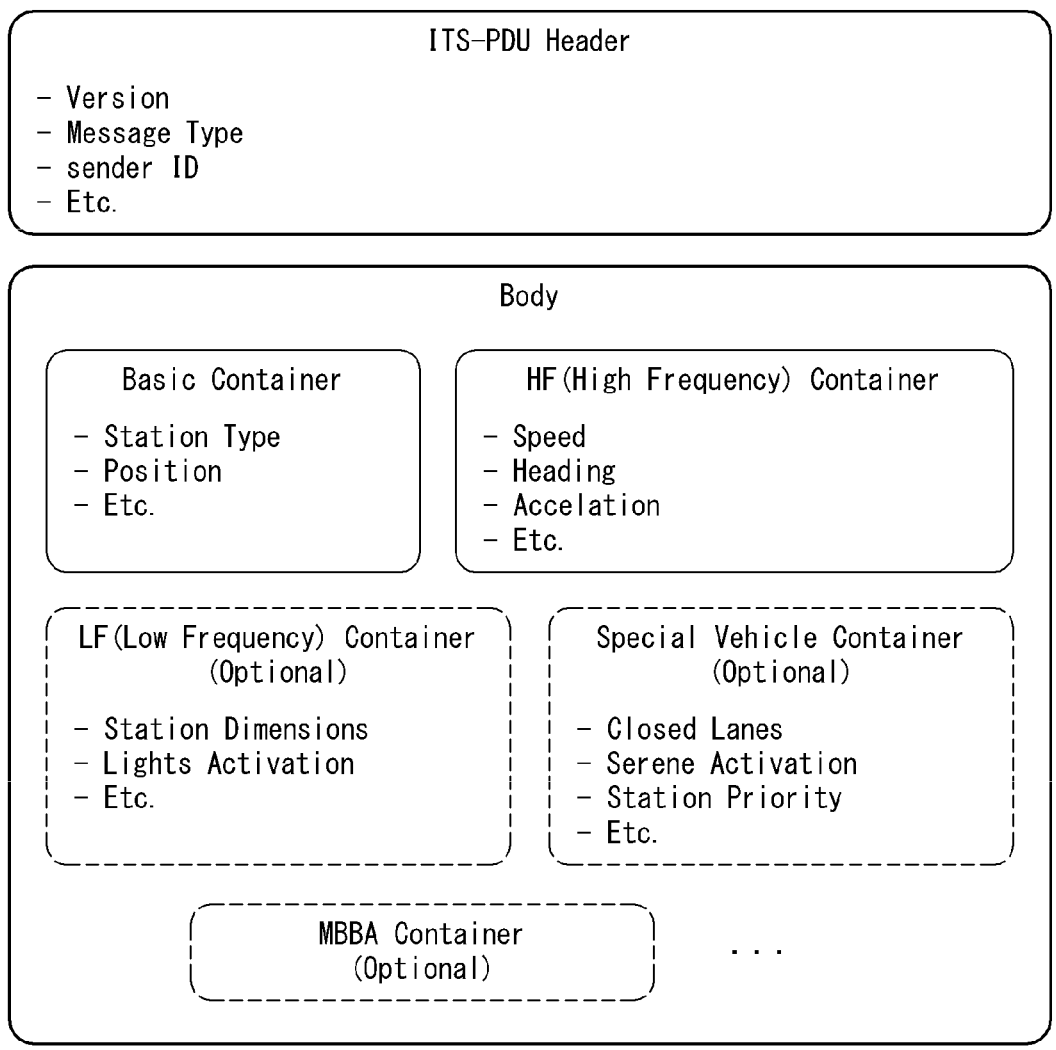
FIG. 19 illustrates a V2X message sent by a V2X communication device to notify that the V2X communication device corresponds to the MBB according to an embodiment of the present invention.

FIG. 19 illustrates a V2X message transmitted by a V2X communication device to notify that the V2X communication device corresponds to the MBB according to an embodiment of the present invention. According to the embodiment illustrated in FIG. 19, the V2X message may have a format of a periodically sent V2X message (e.g., CAM).

Referring to FIG. 19, the V2X message may include an ITS PDU header and a body including at least one container. According to an embodiment, the at least one container may include a basic container, a high frequency (HF) container, a low frequency (LF) container, a special vehicle container, and/or an MBB announcement (MBBA) container. That is, unlike a general CAM, the V2X message may further include the MBBA container to notify that the V2X communication device corresponds to the MBB, or notify that the V2X communication device is operated as the MBB. According to an embodiment, the MBBA container may include one or more information used to notify that the V2X communication device corresponds to the MBB.

Figure 20:
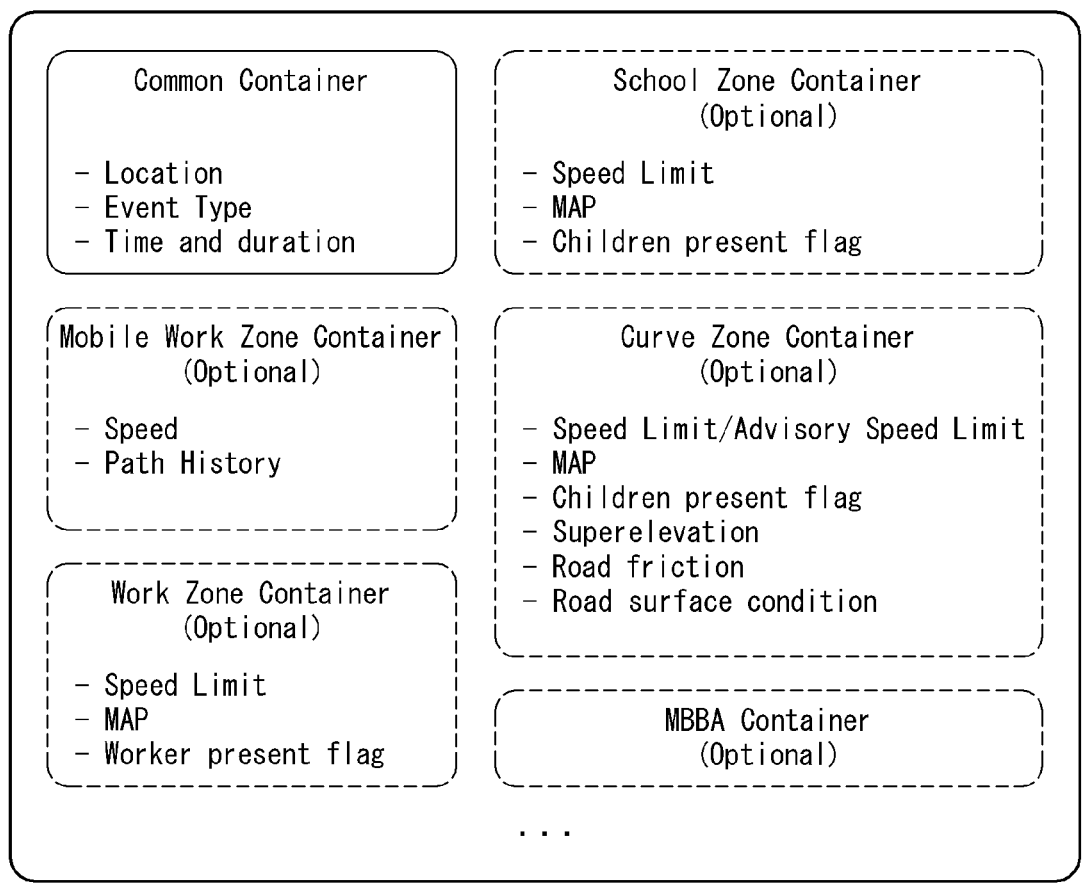
FIG. 20 illustrates a V2X message sent by a V2X communication device to notify that the V2X communication device corresponds to the MBB according to another embodiment of the present invention.

FIG. 20 illustrates a V2X message sent by a V2X communication device to notify that the V2X communication device corresponds to the MBB according to another embodiment of the present invention. According to the embodiment illustrated in FIG. 20, the V2X message may have a format of a periodically sent V2X message (e.g., BIM).

Referring to FIG. 20, the V2X message may include at least one container. According to an embodiment, the at least one container may include a common container. Further, according to an embodiment, the at least one container may include a school zone container, a mobile work zone container, a work zone container, a curve zone container, and/or an MBBA container. The V2X message may include the MBBA container to notify that the V2X communication device corresponds to the MBB, or notify that the V2X communication device is operated as the MBB. According to an embodiment, the MBBA container may include one or more information used to notify that the V2X communication device corresponds to the MBB.

Figure 21:
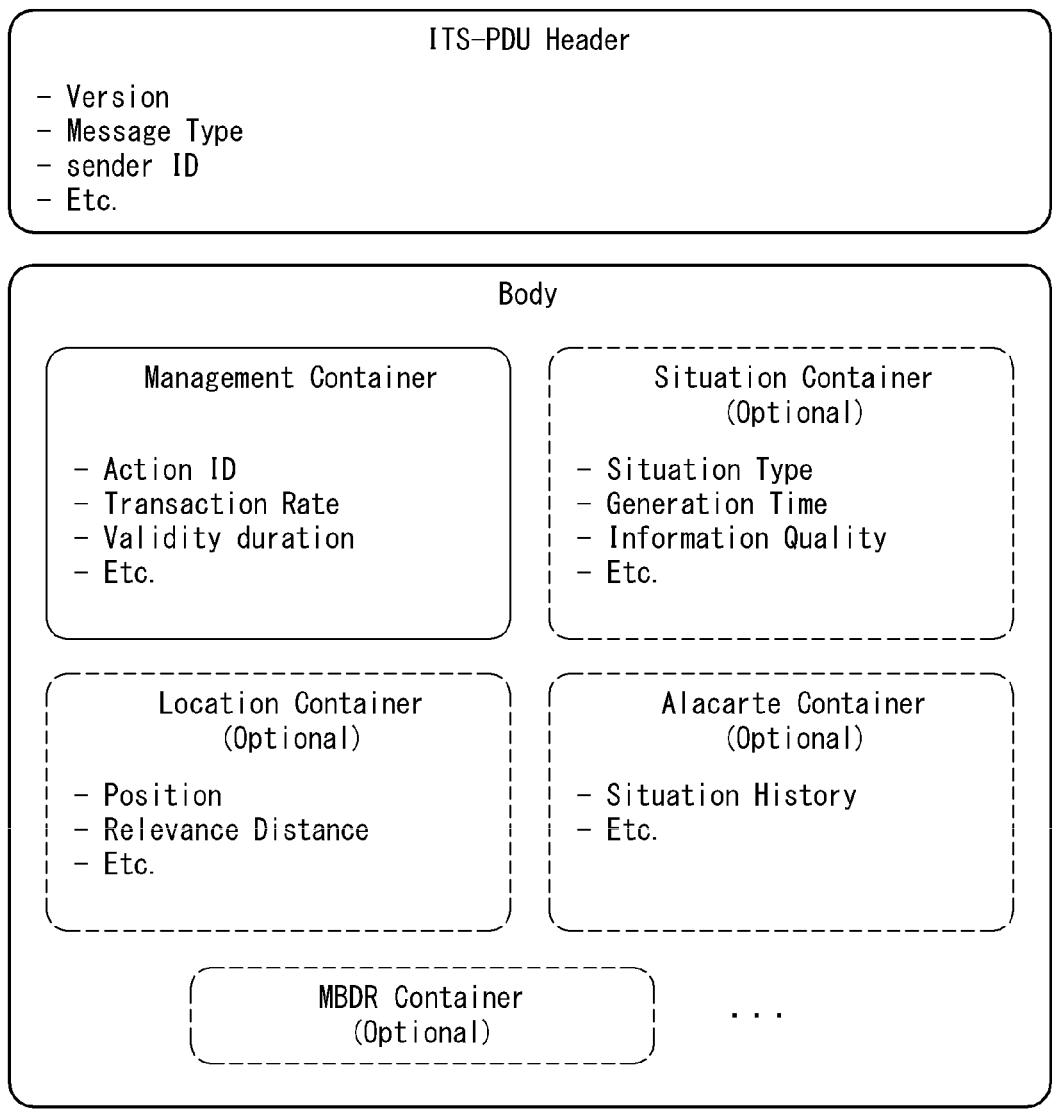
FIG. 21 illustrates a V2X message sent by a V2X communication device to provide MBD information according to an embodiment of the present invention.

FIG. 21 illustrates a V2X message sent by a V2X communication device to provide MBD information according to an embodiment of the present invention. According to the embodiment illustrated in FIG. 21, the V2X message may have a format of a V2X message (e.g., DENM) that is sent aperiodically or set at the time of occurrence of a specific event. As described above, the V2X communication device may send a response message including an MBDR to an MBB V2X communication device in response to a request for MBD information from the MBB V2X communication device.

Referring to FIG. 21, the V2X message may include an ITS PDU header and a body including at least one container. According to an embodiment, the at least one container may include a management container, a situation container, a location container, an "alacarte" container, and/or an MBD report (MBDR) container. The V2X message may include the MBDR container. According to an embodiment, the MBDR container may include at least one MBD-related information (e.g., MBD status information).

Figure 22:
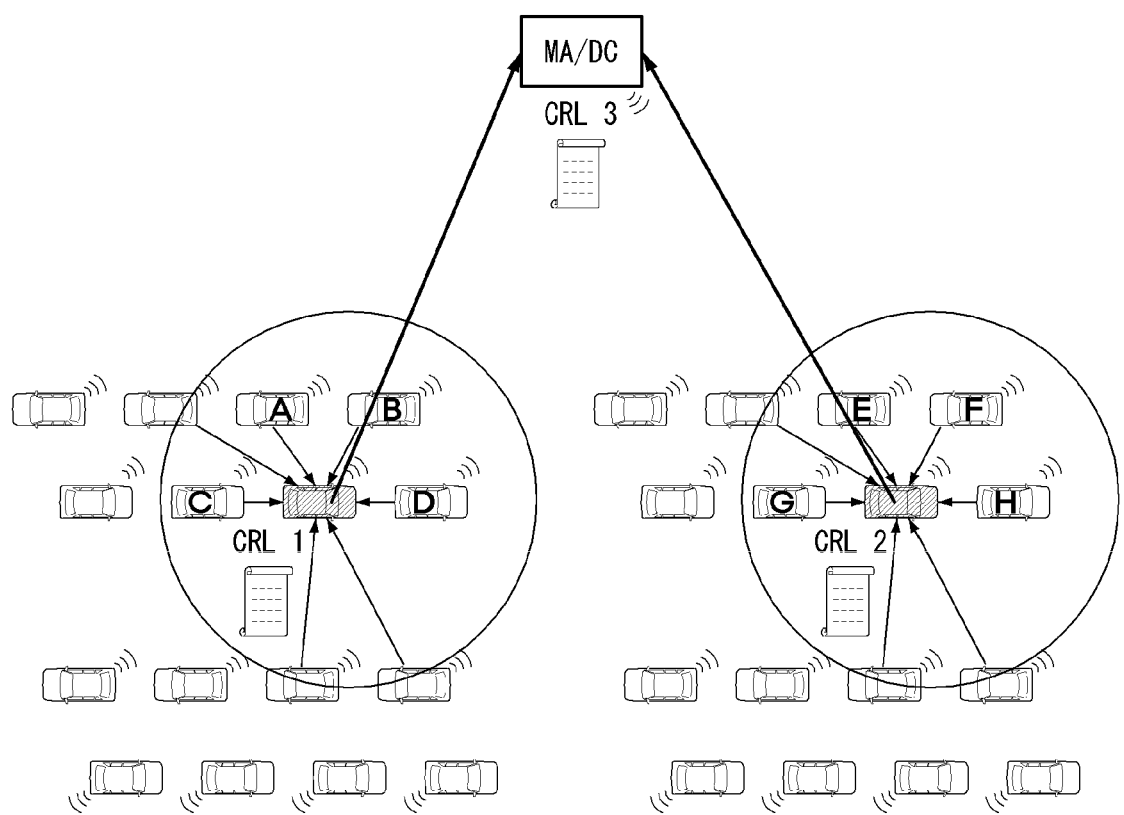
FIG. 22 illustrates a method in which a V2X communication device operated in the MBB CO mode performs V2X communication according to an embodiment of the present invention.

FIG. 22 illustrates a method in which a V2X communication device operated in the MBB CO mode performs V2X communication according to an embodiment of the present invention. In the embodiment illustrated in FIG. 22, it is assumed that two V2X communication devices (MBB V2X communication devices) operated as the MBBs are operated in the MBB CO mode.

As described above, the MBB V2X communication device operated in the MBB CO mode may generate a CRL. However, in the MBB CO mode, the MBB V2X communication device may not directly broadcast the CRL to the surrounding V2X communication device, unlike in the MBB CB mode. Therefore, the MBB V2X communication device needs to forward the generated CRL to the MA/DC, and the MA/DC may generate and broadcast a final CRL based on the CRL forwarded from at least one MBB V2X communication device.

Referring to FIG. 22, each MBB V2X communication device may periodically send or broadcast a V2X message (e.g., CAM) including the MBBA container to a surrounding V2X communication device. For example, a first MBB V2X communication device may periodically broadcast, to a surrounding V2X communication device (A, B, C, D, and the like) a first CAM message including the MBBA container for notifying that the first MBB V2X communication device is an MBB. Further, a second MBB V2X communication device may periodically broadcast, to a surrounding V2X communication device (E, F, G, H, and the like) a second CAM message including the MBBA container for notifying that the second MBB V2X communication device is an MBB. By doing so, the V2X communication device receiving the V2X message including the MBBA container may identify that the corresponding V2X communication device is an MBB V2X communication device.

A V2X communication device (MBD V2X communication device) of which a misbehavior is detected or which is determined as an MBD V2X communication device (e.g., self diagnostic V2X communication device) may send a V2X message (e.g., DENM) including the MBDR container. For example, MBD V2X communication devices (A, B, and C) receiving the first CAM message may each send, to the first MBB V2X communication device, a first DENM message including the MBDR container for the corresponding MBD V2X communication device. Further, MBD V2X communication devices (E and F) receiving the second CAM message may each send, to the second MBB V2X communication device, a second DENM message including the MBDR container for the corresponding MBD V2X communication device.

In the case in which the MBB V2X communication device has the GMBD function, the MBB V2X communication device may add the corresponding MBD V2X communication device to the CRL based on the V2X message (e.g., DENM) including the MBDR container. For example, the first MBB V2X communication device may add the corresponding MBD V2X communication devices (A, B, and C) to a first CRL based on the first DENM message. Further, the second MBB V2X communication device may add the corresponding MBD V2X communication devices (E and F) to a second CRL based on the second DENM message.

The MBB V2X communication device may send the CRL to the MA/DC by using a pre-defined communication method. According to an embodiment, the MBB V2X communication device may send the CRL to the MA/DC by using the most efficient communication method among the pre-defined communication methods, for example, a method of using a DSRC network or a cellular network. For example, the first MBB V2X communication device may send the first CRL to the MA/DC through a DSRC network or cellular network. Further, the second MBB V2X communication device may send the second CRL to the MA/DC through a DSRC network or cellular network.

The MA/DC may generate a final CRL based on the received CRL received from at least one MBB V2X communication device and broadcast the generated final CRL. At this time, the final CRL may include all or part of the MBD V2X communication devices included in the received CRL. For example, the MA/DC may generate a third CRL based on the first CRL received from the first MBB V2X communication device and the second CRL received from the second MBB V2X communication device, and broadcast the generated third CRL. At this time, the third CRL as the final CRL may include all or part of the MBD V2X communication devices (A, B, C, E, and F) included in the first and second CRLs.

Figure 23:
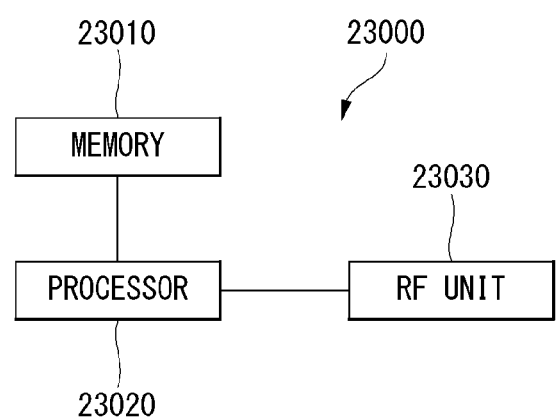
FIG. 23 illustrates a V2X communication device according to an embodiment of the present invention.

FIG. 23 illustrates a V2X communication device according to an embodiment of the present invention.

In FIG. 23, the V2X communication device may include a memory, a processor, and a communication unit. The V2X communication device may be an OBU or an RSU, or may be included in an OBU or an RSU. The V2X communication device may be included in an ITS station or may be an ITS station.

The communication unit may be connected to the processor to transmit/receive a wireless signal. The communication unit may upconvert data received from the processor to a transmission/reception band to transmit a signal. The communication unit may also downconvert a received signal to forward the signal to the processor. The communication unit may implement operation of the access layer. According to an embodiment, the communication unit may also implement operation of the physical layer included in the access layer, or may additionally implement operation of the MAC layer. The communication unit may also include a plurality of sub communication units for communication according to a plurality of communication protocols. According to an embodiment, the communication unit may perform communication based on various wireless local area network (WLAN) communication protocols such as 802.11, WAVE, DSRC, and 4G (long-term evolution (LTE)), and a cellular communication protocol.

The processor may be connected to the communication unit to implement operation of layers according to the ITS system or WAVE system. The processor may be configured to perform operation according to various embodiments of the present invention described above and illustrated in the drawings. Further, at least one of a module, data, a program, or software that implements operation of the V2X communication device according to various embodiments of the present invention described above may be stored in the memory and executed by the processor.

The memory is connected to the processor and stores various information for driving the processor. The memory may be included in the processor or may be installed outside the processor and connected to the processor by known means. The memory may include a secured/unsecured storage device or may be included in a secured/unsecured storage device. According to an embodiment, the memory may also be referred to as a secured/unsecured storage device.

The specific configuration of the V2X communication device illustrated in FIG. may be implemented so that various embodiments of the present invention/specification are independently applied or two or more embodiments are applied together.

Figure 24:
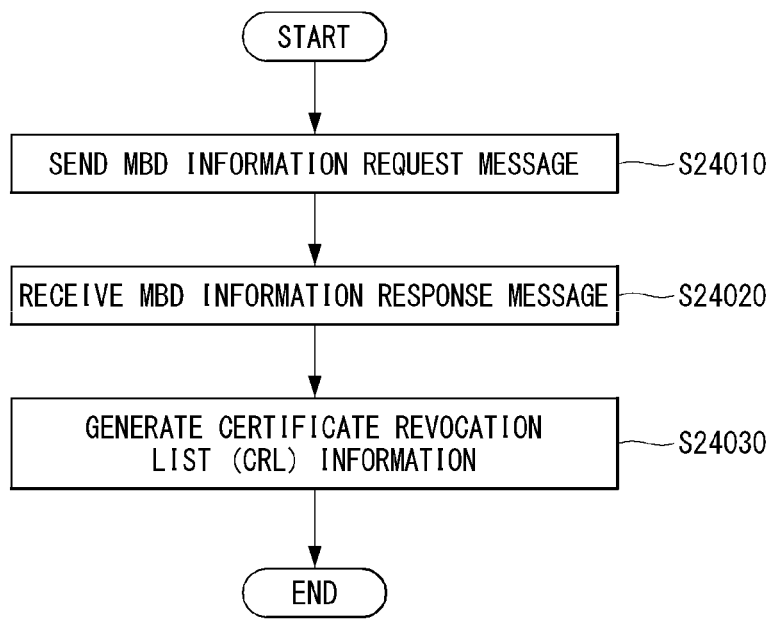
FIG. 24 illustrates a communication method of a V2X communication device according to an embodiment of the present invention.

FIG. 24 illustrates a communication method of a V2X communication device according to an embodiment of the present invention. According to the embodiment illustrated in FIG. 24, the V2X communication device may be operated as the MBB described above.

First, the V2X communication device may send an MBD information request message for collecting information regarding MBD (S24100). At this time, the V2X communication device may have a preset security level (or permission) required for the V2X communication device to be operated as the MBB. Here, the MBB may be an entity for collecting MBD information and/or generating CRL information. The V2X communication device operated as the MBB may have an EC and AT having MBB permission and may perform security processing on the message by using the EC and the AT.

According to an embodiment, the MBD information request message may include MBB announcement information used to notify that the V2X communication device corresponds to the MBB. Further, the MBD information request message may be periodically sent. Such an MBB information request message may be a CAM or BIM including the above-described MBBA container.

The V2X communication device may receive an MBD information response message as a response message to the MBD information request message from an external V2X communication device (S24200). According to an embodiment, the MBD information response message may include MBD information including information regarding a misbehavior of the external V2X communication device. For example, the MBB information may include MBD status information indicating a misbehavior status of the external V2X communication device.

The V2X communication device may generate a CRL information based on the MBD information (S24300).

According to an embodiment, in the case in which the V2X communication device is operated in the first mode, the V2X communication device may forward the CRL information to a CRL distribution device. Here, the first mode may be the MBB CO mode described above. At this time, the V2X communication device may forward the CRL information to the CRL distribution device through a V2X communication device of an infrastructure. Alternatively, in the case in which the V2X communication device has a function of long distance network connection such as cellular network connection, the V2X communication device may directly forward the CRL information to the CRL distribution device through the long distance network. The CRL information forwarded as described above may be broadcasted by the CRL distribution device.

According to another embodiment, in the case in which the V2X communication device is operated in the second mode, the V2X communication device may broadcast the CRL information. Here, the second mode may be the MBB CB mode described above.

Then, the external V2X communication device receiving the CRL information may process the CRL information according to a preset method. For example, the external V2X communication device may exclude a V2X communication device of which a misbehavior is detected, from V2X communication, the V2X communication device of which a misbehavior is detected being included in the CRL information. At this time, the external V2X communication device may exclude the V2X communication device from V2X communication by revoking certificates such as the EC/AT of the V2X communication device of which a misbehavior is detected.

In the embodiments described hereinabove, components and features of the present invention were combined with each other in a predetermined form. It is to be considered that the respective components or features are selective unless separately explicitly mentioned. The respective components or features may be implemented in a form in which they are not combined with other components or features. In addition, some components and/or features may be combined with each other to configure the embodiment of the present invention. A sequence of operations described in the embodiments of the present invention may be changed. Some components or features of any embodiment may be included in another embodiment or be replaced by corresponding components or features of another embodiment. It is obvious that claims that do not have an explicitly referred relationship in the claims may be combined with each other to configure an embodiment or be included in new claims by amendment after application.

Embodiments of the present invention may be implemented by various means, for example, hardware, firmware, software, or a combination thereof, etc. In the case in which an embodiment of the present invention is implemented by the hardware, it may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which an embodiment of the present invention is implemented by the firmware or the software, it may be implemented in a form of a module, a procedure, a function, or the like, performing the functions or the operations described above. A software code may be stored in a memory and be driven by a processor. The memory may be positioned inside or outside the processor and transmit and receive data to and from the processor by various well-known means.

It is obvious to those skilled in the art that the present invention may be embodied in another specific form without departing from the essential feature of the present invention. Therefore, the above-mentioned detailed description is to be interpreted as being illustrative rather than being restrictive in all aspects. The scope of the present invention is to be determined by reasonable interpretation of the claims, and all modifications within an equivalent range of the present invention fall in the scope of the present invention.

MODE FOR INVENTION

It will be apparent to those skilled in the art that various modifications and variations can be made in the present invention without departing from the spirit or scope of the present invention. Thus, it is intended that the present invention covers the modifications and variations of the present invention within the scope of the appended claims and their equivalents.

Both apparatus and method inventions are mentioned in the present specification and descriptions of both of the apparatus and method inventions may be complementarily applicable to each other.

Various embodiments have been described in the best mode for carrying out the present invention.

INDUSTRIAL APPLICABILITY

The present invention is applicable to a smart car/connected car field or V2X communication field.

It will be apparent to those skilled in the art that various modifications and variations can be made in the present invention without departing from the spirit or scope of the present invention. Thus, it is intended that the present invention covers the modifications and variations of the present invention within the scope of the appended claims and their equivalents.

The invention claimed is:

1. A data communication method of a vehicle-to-everything (V2X) communication device, the data communication method comprising:
   transmitting, to an external V2X communication device, a misbehavior detection (MBD) information request message for requesting MBD status information for a misbehavior detection,
   wherein the MBD information request message includes misbehavior broker (MBB) announcement information to notify that the V2X communication device corresponds to a MBB;
   obtaining, from the external V2X communication device, the MBD status information based on the MBB announcement information,
   wherein the MBD status information represents whether a misbehavior of the external V2X communication device is detected; and
   generating, based on one of a plurality of operation modes, certificate revocation list (CRL) information based on the MBD status information,
   wherein the plurality of operation modes includes (i) a first mode for transmitting, to a CRL distribution network node, the obtained MBD status information based on a long distance network without generating the CRL information, (ii) a second mode for transmitting, to the CRL distribution network node, the obtained MBD status information based on the long distance network by generating the CRL information, and (iii) a third mode for broadcasting, to the external V2X communication device, the obtained MBD status information by generating the CRL information, and
   wherein the V2X communication device has a preset security level required for the V2X communication device to be operated as an MBB generating the CRL information.

2. The data communication method of claim 1,
   wherein the preset security level is determined based on an authorization ticket (AT) and an enrollment certificate (EC) obtained by an authentication process.

3. The data communication method of claim 2,
   wherein the EC is obtained from an enrollment authority (EA) which authenticates a V2X communication device and grants an access for V2X communication, and
   wherein the AT is obtained from an authorization authority (AA) which issues and monitors use of the AT.

4. The data communication method of claim 1,
   wherein the MBD information request message is periodically transmitted.

5. The data communication method of claim 1, further comprising:
   based on an operation mode of the V2X communication device being the second mode:
      forwarding the CRL information to the CRL distribution network node,
         wherein the CRL information is broadcasted by the CRL distribution network node.

6. The data communication method of claim 5,
   wherein the CRL information is directly forwarded to the CRL distribution network node through the long distance network.

7. The data communication method of claim 1, further comprising:
   based on an operation mode of the V2X communication device being the third mode:
      broadcasting, to the external V2X communication device, the CRL information when the V2X communication device operates in a second mode.

8. A V2X communication device comprising:
   a storage device configured to store data;
   a radio frequency (RF) unit configured to transmit and receive a wireless signal; and
   a processor configured to control the RF unit,
   wherein the processor is configured to:
   transmit, to an external V2X communication device, a misbehavior detection (MBD) information request message for requesting MBD status information for a misbehavior detection,
   wherein the MBD information request message includes misbehavior broker (MBB) announcement information to notify that the V2X communication device corresponds to a MBB;
   obtain, from the external V2X communication device, the MBD status information based on the MBB announcement information,
   wherein the MBD status information represents whether a misbehavior of the external V2X communication device is detected; and
   generate, based on one of a plurality of operation modes, certificate revocation list (CRL) information based on the MBD status information,
   wherein the plurality of operation modes includes (i) a first mode for transmitting, to a CRL distribution network node, the obtained MBD status information based on a long distance network without generating the CRL information, (ii) a second mode for transmitting, to the CRL distribution network node, the obtained MBD status information based on the long distance network by generating the CRL information, and (iii) a third mode for broadcasting, to the external V2X communication device, the obtained MBD status information by generating the CRL information, and
   wherein the V2X communication device has a preset security level required for the V2X communication device to be operated as an MBB generating the CRL information.

9. The V2X communication device of claim 8,
   wherein the MBD information request message is periodically transmitted.

10. The V2X communication device of claim 8,
    wherein the processor is further configured to, based on an operation mode of the V2X communication device being the second mode:
    forward the CRL information to the CRL distribution network node,
       wherein the CRL information is broadcasted by the CRL distribution network node.

11. The V2X communication device of claim 10,
    wherein the CRL information is directly forwarded to the CRL distribution network node through the long distance network.

12. The V2X communication device of claim 8,
    wherein the processor is further configured to, based on an operation mode of the V2X communication device being the third mode:
    broadcast, to the external V2X communication device, the CRL information.

* * * * *